United States Patent
Dabeer et al.

(10) Patent No.: US 10,159,049 B2
(45) Date of Patent: *Dec. 18, 2018

(54) CCA CLEARANCE IN UNLICENSED SPECTRUM

(71) Applicant: QUALCOMM Incorporated, San Diego, CA (US)

(72) Inventors: Onkar Dabeer, San Diego, CA (US); Aleksandar Damnjanovic, Del Mar, CA (US); Srinivas Yerramalli, San Diego, CA (US); Wanshi Chen, San Diego, CA (US); Kiran Kumar Somasundaram, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,017

(22) Filed: Aug. 17, 2017

(65) Prior Publication Data

US 2017/0374628 A1 Dec. 28, 2017

Related U.S. Application Data

(63) Continuation of application No. 14/743,312, filed on Jun. 18, 2015, now Pat. No. 9,743,363.

(Continued)

(51) Int. Cl.
*H04W 52/24* (2009.01)
*H04W 52/26* (2009.01)
(Continued)

(52) U.S. Cl.
CPC ....... *H04W 52/246* (2013.01); *H04W 52/241* (2013.01); *H04W 52/262* (2013.01);
(Continued)

(58) Field of Classification Search
CPC .............. H04B 7/0874; H04W 52/225; H04W 52/241; H04W 52/243; H04W 52/246; H04W 52/262; H04W 74/0808
(Continued)

(56) References Cited

U.S. PATENT DOCUMENTS 8,411,629 B1  4/2013  Qian et al.
8,423,072 B2  4/2013  Whinnett
(Continued)

OTHER PUBLICATIONS

Alcatel-Lucent et al., "Review of Regulatory Requirement for Unlicensed Spectrum", 3GPP Draft, Unlicensed Spectrum Summary, URL: http://www.3gpp.org/ftp/workshop/2014-06-13_LTE-U/Docs/, RWS-140015, Jun. 13, 2014, 12 pgs., 3rd Generation Partnership Project.
(Continued)

*Primary Examiner* — Tan H Trinh
(74) *Attorney, Agent, or Firm* — Liem T. Do

(57) ABSTRACT

Techniques are described for contention-based wireless communications channel access that may improve the likelihood that a contention procedure will pass and allow a device to transmit an uplink or downlink transmission using the contention-based channel. Various disclosed techniques may determine a transmit power for a subsequent transmission based on channel characteristics during one or more clear channel assessment (CCA) time durations. The transmit power may be selected to provide a CCA threshold that may increase the likelihood that a device will win contention for the channel during the CCA procedure.

30 Claims, 17 Drawing Sheets

Related U.S. Application Data

(60) Provisional application No. 62/016,628, filed on Jun. 24, 2014.

(51) Int. Cl.
  *H04W 74/08* (2009.01)
  *H04W 52/22* (2009.01)
  *H04B 7/08* (2006.01)

(52) U.S. Cl.
  CPC ....... *H04W 74/0808* (2013.01); *H04B 7/0874* (2013.01); *H04W 52/225* (2013.01); *H04W 52/243* (2013.01)

(58) Field of Classification Search
  USPC ............. 455/69, 522, 63.1, 127.1, 132, 574, 455/67.11, 450, 560; 370/254, 445, 311, 370/329, 336, 330, 312, 332, 350, 252, 370/338, 333; 709/225
  See application file for complete search history.

(56) References Cited

U.S. PATENT DOCUMENTS

| | | | |
|---|---|---|---|
| 8,831,121 B1 | 9/2014 | Qi et al. | |
| 9,743,363 B2 | 8/2017 | Dabeer et al. | |
| 2002/0060995 A1 | 5/2002 | Cervello et al. | |
| 2002/0188723 A1* | 12/2002 | Choi ................... | H04W 36/06 709/225 |
| 2005/0059422 A1 | 3/2005 | Rudolf et al. | |
| 2005/0135295 A1 | 6/2005 | Walton et al. | |
| 2005/0152313 A1 | 7/2005 | Cave et al. | |
| 2006/0068854 A1 | 3/2006 | Sandhu | |
| 2006/0268924 A1 | 11/2006 | Marinier et al. | |
| 2007/0060057 A1 | 3/2007 | Matsuo et al. | |
| 2007/0060155 A1 | 3/2007 | Kahana et al. | |
| 2007/0242621 A1 | 10/2007 | Nandagopalan et al. | |
| 2008/0008133 A1 | 1/2008 | Zhu et al. | |
| 2009/0005102 A1 | 1/2009 | Das et al. | |
| 2009/0111499 A1* | 4/2009 | Bosch ................. | H04W 52/325 455/522 |
| 2009/0163238 A1 | 6/2009 | Rao et al. | |
| 2009/0252053 A1 | 10/2009 | Leith et al. | |
| 2010/0029319 A1 | 2/2010 | Higuchi et al. | |
| 2010/0118716 A1 | 5/2010 | Lakkis et al. | |
| 2010/0150013 A1 | 6/2010 | Hara et al. | |
| 2012/0225687 A1 | 9/2012 | Norair | |
| 2013/0017794 A1* | 1/2013 | Kloper ................. | H04W 74/0808 455/63.1 |
| 2013/0070627 A1 | 3/2013 | Chen et al. | |
| 2013/0115998 A1 | 5/2013 | Lamm et al. | |
| 2013/0223266 A1 | 8/2013 | Goto et al. | |
| 2013/0229996 A1 | 9/2013 | Wang et al. | |
| 2013/0231153 A1 | 9/2013 | Guillet et al. | |
| 2013/0286959 A1 | 10/2013 | Lou et al. | |
| 2014/0079016 A1 | 3/2014 | Dai et al. | |
| 2014/0153460 A1 | 6/2014 | Shrivastava et al. | |
| 2014/0219243 A1 | 8/2014 | Meshkati et al. | |
| 2014/0254510 A1 | 9/2014 | Porat | |
| 2014/0293905 A1 | 10/2014 | Tian et al. | |
| 2014/0334473 A1 | 11/2014 | Zhang et al. | |
| 2014/0341207 A1* | 11/2014 | Bhushan ............ | H04W 28/0289 370/350 |
| 2015/0023315 A1 | 1/2015 | Yerramalli et al. | |
| 2015/0032868 A1 | 1/2015 | Sung et al. | |
| 2015/0063148 A1 | 3/2015 | Sadek | |
| 2015/0071060 A1 | 3/2015 | Bhushan et al. | |
| 2015/0071215 A1 | 3/2015 | Tian et al. | |
| 2015/0078216 A1 | 3/2015 | Ribeiro et al. | |
| 2015/0099525 A1* | 4/2015 | Ji ........................ | H04W 72/04 455/450 |
| 2015/0103777 A1* | 4/2015 | Chen .................... | H04W 76/15 370/329 |
| 2015/0163824 A1 | 6/2015 | Krzymien et al. | |
| 2015/0208253 A1 | 7/2015 | Kim et al. | |
| 2015/0215874 A1 | 7/2015 | Chen et al. | |
| 2015/0245358 A1 | 8/2015 | Schmidt | |
| 2015/0250002 A1 | 9/2015 | Sun et al. | |
| 2015/0319700 A1* | 11/2015 | Oteri .................... | H04W 52/28 455/127.1 |
| 2015/0358904 A1* | 12/2015 | Kwon ............... | H04W 52/0206 370/252 |
| 2015/0358995 A1 | 12/2015 | Li et al. | |
| 2015/0372842 A1 | 12/2015 | Wicker, Jr. et al. | |
| 2015/0373741 A1* | 12/2015 | Yerramalli ............ | H04W 24/08 370/336 |
| 2015/0382329 A1* | 12/2015 | Frenne .................... | H04L 5/001 370/329 |
| 2016/0050674 A1 | 2/2016 | Kenney et al. | |
| 2016/0219441 A1* | 7/2016 | Park ................... | H04W 74/0816 |
| 2016/0227489 A1* | 8/2016 | Oteri ................ | H04W 74/0808 |
| 2016/0286499 A1 | 9/2016 | Lim et al. | |
| 2017/0085346 A1 | 3/2017 | Tiirola et al. | |
| 2018/0063796 A1* | 3/2018 | Oteri ................ | H04W 74/0808 |

OTHER PUBLICATIONS

ISA/EPO, International Search Report and Written Opinion of the International Searching Authority, Int'l. App. No. PCT/US2015/036713, dated Sep. 8, 2015, European Patent Office, Rijswijk, NL, 12 pgs.

* cited by examiner

CCA CLEARANCE IN UNLICENSED SPECTRUM

CROSS REFERENCES

The present application for patent is a continuation of U.S. patent application Ser. No. 14/743,312 by Dabeer et al., entitled "Improving CCA Clearance in Unlicensed Spectrum," filed Jun. 18, 2015, which claims priority to U.S. Provisional Patent Application No. 62/016,628 by Dabeer et al., entitled "Improving CCA Clearance in Unlicensed Spectrum," filed Jun. 24, 2014, assigned to the assignee hereof, and expressly incorporated by reference herein.

FIELD OF DISCLOSURE

The following relates generally to wireless communication, and more specifically to clear channel assessment techniques when using an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple wireless devices (e.g., mobile phones or tablet computers). A base station may communicate with wireless devices on downlink channels (e.g., for transmissions from the base station to the wireless devices) and uplink channels (e.g., for transmissions from the wireless devices to the base station).

Some modes of communication may enable communications with a wireless device over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a wireless communications system operator with opportunities for enhanced data transmission capacity. An unlicensed radio frequency spectrum band may provide one or more contention-based communications channels in which a transmitting apparatus may, in some examples, perform a listen before talk (LBT) procedure to contend for access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is unavailable (e.g., because another device is already using the channel of the unlicensed radio frequency spectrum band), a CCA may be performed for the channel again at a later time. When it is determined that the channel of the unlicensed radio frequency spectrum band is available, or clear, a channel usage beacon signal (CUBS) may be transmitted over the channel, to reserve the channel until a downlink transmission or uplink transmission may be made over the channel.

SUMMARY

The present disclosure generally relates to one or more improved techniques for contention-based channel access that may improve the likelihood that the contention procedure will pass and allow a device to transmit an uplink or downlink transmission using the contention-based channel. The contention-based channel may be for example, a channel of an unlicensed radio frequency spectrum band that may be accessed through a CCA procedure. More particularly, various disclosed techniques determine a transmit power for a subsequent transmission based on channel characteristics during one or more CCA time durations or during other time durations equal to the CCA time duration. The transmit power may be selected to provide a CCA threshold that may increase the likelihood that a device will win contention for the channel during the CCA procedure. In certain examples, the transmit power may be set such that the transmitting device will always win contention by transmitting at a power that avoids interference with other devices using the channel. Data transmissions may be transmitted using a reduced power, and control signals, such as synchronization signals or reference signals, may be transmitted at a higher power to enhance likelihood of reception of such signals. In some examples, channel conditions may be monitored for a number of different antennas, and a set of antennas for a subsequent transmission may be selected based on an associated channel with a higher likelihood of a successful CCA.

In a first set of illustrative examples, a method for wireless communication is described. In one example, the method may include determining a channel condition for a clear channel assessment (CCA) time duration; and adjusting at least one of a transmit power or a CCA threshold level based on the determining.

In some examples of the method, the adjusting may include adjusting the transmit power based on the channel condition; and adjusting the CCA threshold level based on the adjusted transmit power. Additionally or alternatively, the adjusting may include adjusting the CCA threshold level based on the channel condition; and adjusting the transmit power based on the adjusted CCA threshold level.

In certain examples, the method also may include adjusting a modulation and coding scheme (MCS) based on the determined channel condition. Additionally or alternatively, the method may also include determining that a channel is unavailable for transmission when an energy on the channel during the CCA exceeds the adjusted CCA threshold level; and determining that the channel is available for transmission when the energy on the channel is less than the adjusted CCA threshold level.

The method, in certain examples, also may include transmitting one or more control signals using an unadjusted transmit power; and transmitting data signals at the adjusted transmit power. Such control signals may include, for example, a primary synchronization signal (PSS), secondary synchronization signal (SSS); a master information block (MIB), a system information block (SIB), a common reference signal (CRS), or combinations thereof.

In some examples of the method, the determining may include monitoring the channel condition during a plurality of CCA time durations; and determining an expected channel condition for a subsequent CCA time slot. In certain examples of the method, the method also may include selecting at least one antenna of a plurality of antennas to be used for performing a CCA; performing a CCA using the selected antenna(s); determining that a channel is unavailable for transmission when an energy on the channel during the CCA exceeds the CCA threshold level; and determining that the channel is available for transmission when the energy on the channel is less than the CCA threshold level. The determining may include, in examples, monitoring a channel condition on each of the plurality of antennas during a plurality of CCA time durations; and determining an expected channel condition for each monitored antenna for a subsequent CCA time duration.

In certain examples of the method, the determining may include determining at least one statistic for the channel condition based on a plurality of channel condition measurements during a plurality of CCA time durations. The at least one statistic may include, for example, a cumulative distribution function (CDF). In some examples, the method also may include transmitting the at least one statistic to a base station, and the adjusting may include receiving one or more of the adjusted transmit power, adjusted CCA threshold, or a modulation and coding scheme (MCS) to be used for an uplink transmission. The one or more adjusted transmit power, adjusted CCA threshold, or MCS may be received, for example, semi-statically or dynamically.

In a second set of illustrative examples, an apparatus for wireless communication is described. In one configuration, the apparatus may include means for determining a channel condition for a clear channel assessment (CCA) time duration; and means for adjusting at least one of a transmit power or a CCA threshold level based on the determining. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to determine a channel condition for a clear channel assessment (CCA) time duration; and adjust at least one of a transmit power or a CCA threshold level based on the determination. In some examples, the instructions may also be executable by the processor to implement one or more aspects of the method for wireless communication described above with respect to the first set of illustrative examples.

In a fourth set of illustrative examples, a non-transitory computer-readable medium storing code for wireless communication is described. The code may include instructions executable by a processor to determine a channel condition for a clear channel assessment (CCA) time duration; and adjust at least one of a transmit power or a CCA threshold level based on the determination. In some examples, the instructions may also be executable by the processor to cause the wireless communication apparatus to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
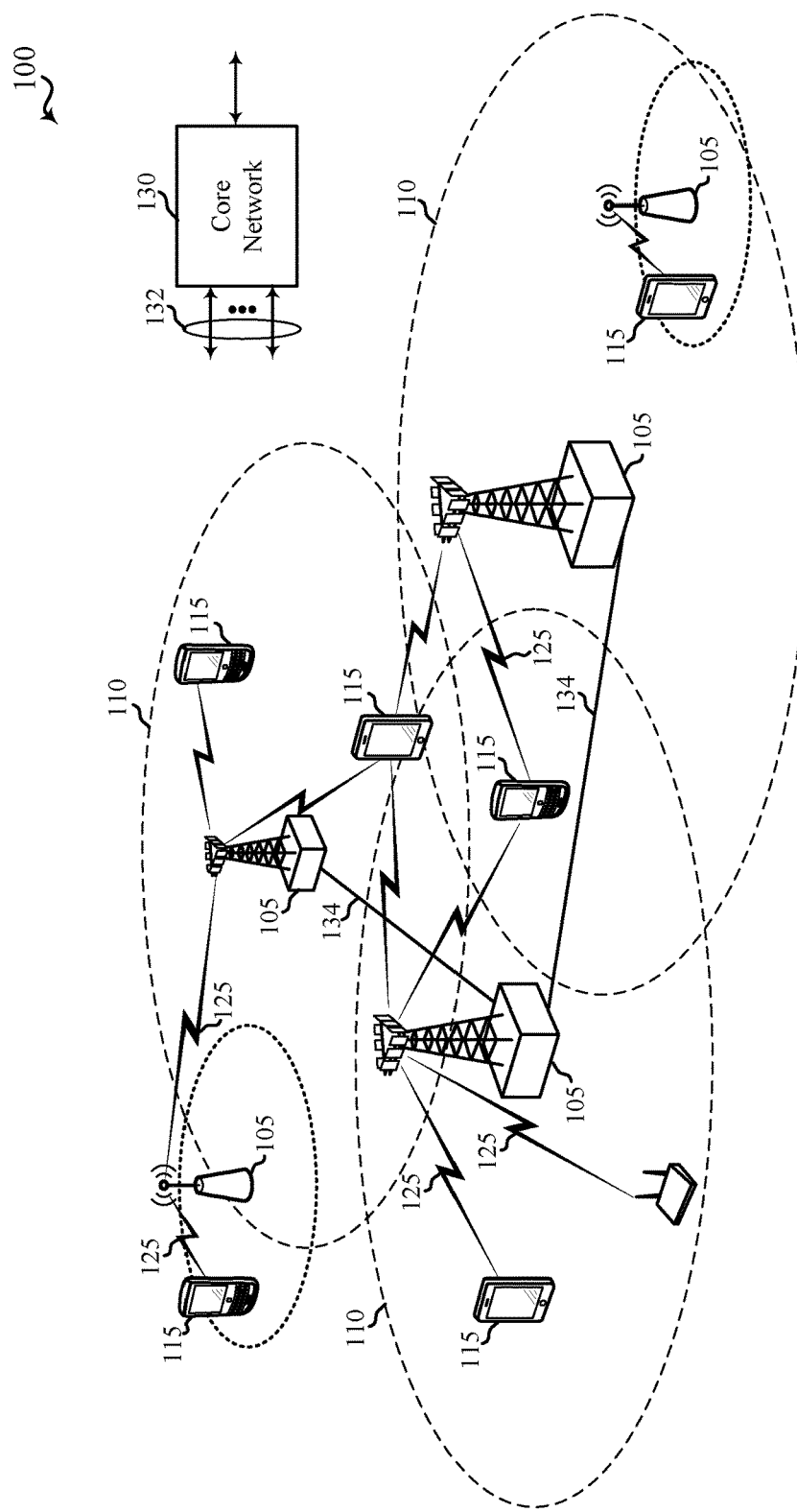
FIG. 1 shows a block diagram of a wireless communication system, in accordance with various aspects of the present disclosure.

Techniques are described in which likelihood of gaining contention-based channel access for uplink and downlink transmissions over an unlicensed radio frequency spectrum band may be increased. In some examples, the unlicensed radio frequency spectrum band may be used for cellular communications (e.g., Long Term Evolution (LTE) communications or LTE-Advanced (LTE-A) communications). In some examples, the unlicensed radio frequency spectrum band may be a radio frequency spectrum band for which apparatuses may need to contend for access because the radio frequency spectrum band is available, at least in part, for unlicensed use such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform an LBT procedure to gain access to the unlicensed radio frequency spectrum band. Such an LBT procedure may include performing a CCA (including, in some examples, an extended CCA) to determine whether a channel of the unlicensed radio frequency spectrum band is available. When it is determined that a channel is not available, a CCA may be performed for the channel again at a later time.

Various disclosed techniques may determine a transmit power for a subsequent transmission, should CCA be successful, based on channel characteristics during one or more current or previous CCA time durations (or other time durations equal to the CCA time duration). The transmit power may be selected, for example, to provide a CCA threshold that may increase the likelihood that a device will win contention for the channel during the CCA procedure. In certain examples, the transmit power may be set such that the transmitting device will always win contention by transmitting at a power that avoids interference with other devices using the channel. In some examples, data transmissions may be transmitted using a reduced power, and control signals, such as synchronization signals or reference signals, may be transmitted at a higher power to enhance likelihood of reception of such signals. In some examples, channel conditions may be monitored for a number of different antennas, and an antenna for a subsequent transmission selected based on an associated channel with a higher likelihood of a successful CCA. Additionally or alternatively, a modulation and coding scheme (MCS) may be adjusted based on the determined channel conditions.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of wireless devices 115 (e.g., user equipment (UEs)), and a core network 130. Some of the base stations 105 may communicate with the wireless devices 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the wireless devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a wireless local area network (WLAN) access point, a WiFi node or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

In examples that use contention-based channel access, the base stations 105 or the wireless devices 115 may employ one or more techniques to increase the likelihood of gaining contention-based channel access for downlink or uplink transmissions. In some examples, a base station 105 or wireless device 115 may determine channel conditions for one or a number of channels of the unlicensed radio frequency spectrum band during a time period that may be used for a CCA. Based on the observed channel conditions, the transmitting device, namely the base station 105 or wireless device 115, may adjust a transmit power, a CCA threshold level, a modulation and coding scheme (MCS), or transmitting antenna(s), such that the probability or gaining channel access through the CCA procedure is increased. Various examples of such techniques will be described in more detail below.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The wireless devices 115 may be dispersed throughout the wireless communication system 100. A wireless device 115 may also be referred to by those skilled in the art as a UE, a mobile device, a mobile station, a subscriber station, a mobile unit, a subscriber unit, a wireless unit, a remote unit, a wireless communication device, a remote device, a mobile subscriber station, an access terminal, a mobile terminal, a wireless terminal, a remote terminal, a handset, a user agent, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A wireless device 115 may be able to communicate with macro eNBs, pico eNBs, femto eNBs, relays, and the like. A wireless device 115 may also be able to communicate over different types of access networks, such as cellular or other wireless wide area network (WWAN) access networks, or WLAN access networks. In some modes of communication with a wireless device 115, communication may be conducted over a plurality of communication links 125 or channels (i.e., component carriers), with each channel using a component carrier between the wireless device 115 and one of a number of cells (e.g., serving cells, which cells may in some cases be operated by the same or different base stations 105).

Each component carrier may be provided over the licensed radio frequency spectrum band or the unlicensed radio frequency spectrum band, and a set of component carriers used in a particular mode of communication may all be received (e.g., at a wireless device 115) over the licensed radio frequency spectrum band, all be received (e.g., at a wireless device 115) over the unlicensed radio frequency spectrum band, or be received (e.g., at a wireless device 115) over a combination of the licensed radio frequency spectrum band and the unlicensed radio frequency spectrum band.

The communication links 125 shown in wireless communication system 100 may include uplink channels (using component carriers) for carrying uplink (UL) communications (e.g., transmissions from a wireless device 115 to a base station 105) or downlink channels (using component carriers) for carrying downlink (DL) communications (e.g., transmissions from a base station 105 to a wireless device 115). The UL communications or transmissions may also be called reverse link communications or transmissions, while the DL communications or transmissions may also be called forward link communications or transmissions. The downlink communications or uplink communications may be made using the licensed radio frequency spectrum band, the unlicensed radio frequency spectrum band, or both.

In some examples of the wireless communication system 100, LTE/LTE-A may be deployed under different scenarios using the unlicensed radio frequency spectrum band. The deployment scenarios may include a supplemental downlink mode in which LTE/LTE-A downlink communications in the licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, or a standalone mode in which LTE/LTE-A downlink and uplink communications between a base station 105 and a wireless device 115 may take place in the unlicensed radio frequency spectrum band. Base stations 105 as well as wireless devices 115 may in some examples support one or more of these or similar modes of operation. OFDMA waveforms may be used in the communication links 125 for LTE/LTE-A downlink communications in the licensed radio frequency spectrum band or the unlicensed radio frequency spectrum band, while OFDMA, SC-FDMA or resource block interleaved FDMA waveforms may be used in the communication links 125 for LTE/LTE-A uplink communications in the licensed radio frequency spectrum band or the unlicensed radio frequency spectrum band.

Figure 2:
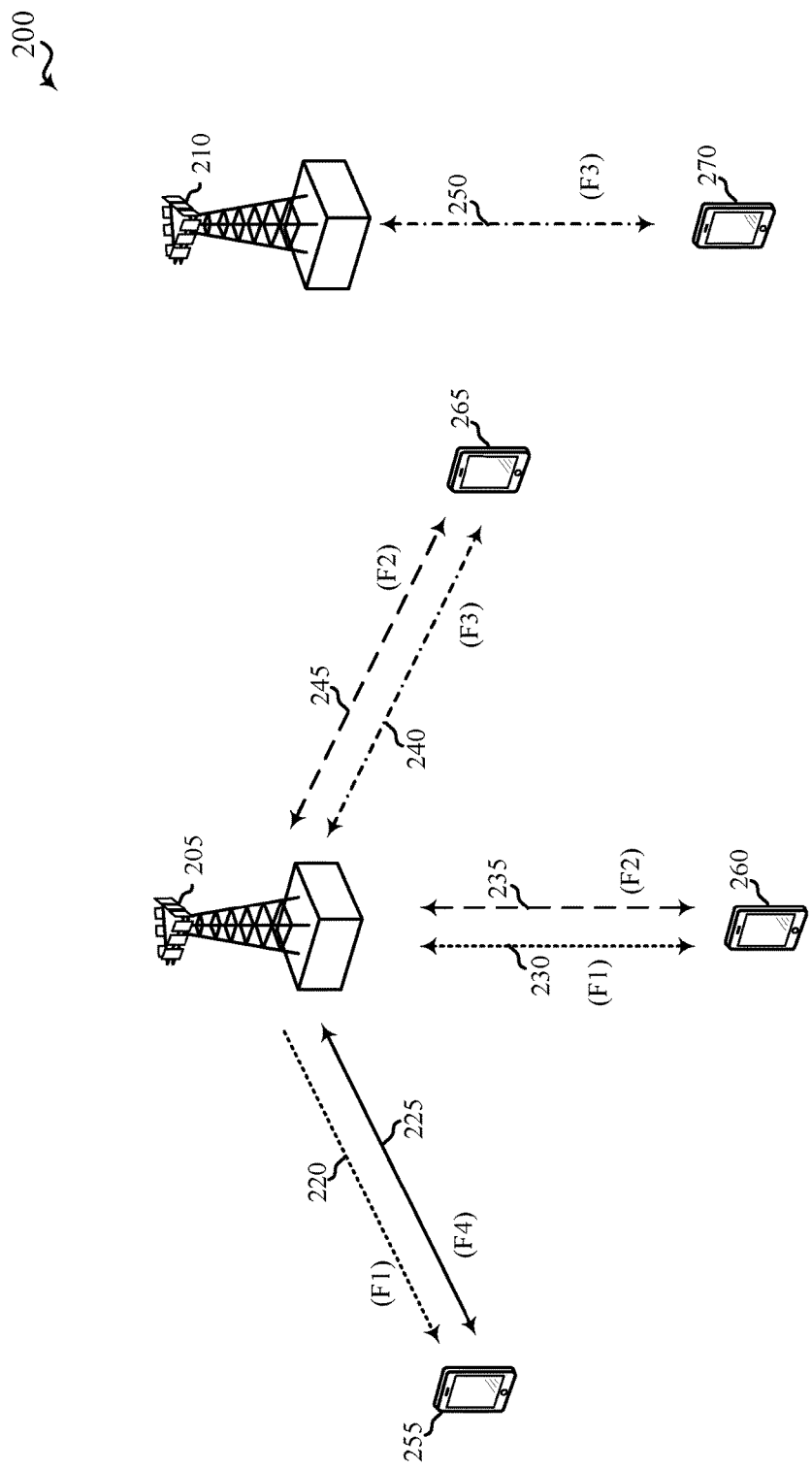
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 210 may be examples of aspects of one or more of the base stations 105 described with reference to FIG. 1, while a first wireless device 255, a second wireless device 260, a third wireless device 265, and a fourth wireless device 270 may be examples of aspects of one or more of the wireless devices 115 described with reference to FIG. 1.

In the example of a supplemental downlink mode in the wireless communication system 200, the first base station 205 may transmit OFDMA waveforms to the first wireless device 255 using a downlink channel 220. The downlink channel 220 may be associated with a frequency F1 in an unlicensed radio frequency spectrum band. The first base station 205 may transmit OFDMA waveforms to the first wireless device 255 using a first bidirectional link 225 and may receive SC-FDMA waveforms from the first wireless device 255 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one wireless device) or for multicast services (e.g., addressed to several wireless devices). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second wireless device 260 using a second bidirectional link 230 and may receive OFDMA waveforms, SC-FDMA waveforms, or resource block interleaved FDMA waveforms from the second wireless device 260 using the second bidirectional link 230. The second bidirectional link 230 may be associated with the frequency F1 in the unlicensed radio frequency spectrum band. The first base station 205 may also transmit OFDMA waveforms to the second wireless device 260 using a third bidirectional link 235 and may receive SC-FDMA waveforms from the second wireless device 260 using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third wireless device 265 using a fourth bidirectional link 240 and may receive OFDMA waveforms, SC-FDMA waveforms, or resource block interleaved waveforms from the third wireless device 265 using the fourth bidirectional link 240. The fourth bidirectional link 240 may be associated with a frequency F3 in the unlicensed radio frequency spectrum band. The first base station 205 may also transmit OFDMA waveforms to the third wireless device 265 using a fifth bidirectional link 245 and may receive SC-FDMA waveforms from the third wireless device 265 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and unlicensed access radio frequency spectrum for capacity offload.

As described above, one type of service provider that may benefit from the capacity offload offered by using LTE/LTE-A in unlicensed access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using unlicensed access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 210 may transmit OFDMA waveforms to the fourth wireless device 270 using a bidirectional link 250 and may receive OFDMA waveforms, SC-FDMA waveforms, or resource block interleaved FDMA waveforms from the fourth wireless device 270 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 210 described with reference to FIG. 1 or 2, or one of the wireless devices 115, 255, 260, 265, or 270 described with reference to FIG. 1 or 2, may use a gating interval to gain access to a channel of an unlicensed radio frequency spectrum band (e.g., to a physical channel of the unlicensed radio frequency spectrum band). The gating interval may define the application of a contention-based protocol in an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting device whether a channel of an unlicensed radio frequency spectrum band is available or in use for the gating interval (also referred to as an LBT radio frame or a CCA frame). When a CCA indicates that the channel is available (e.g., "clear" for use) for a corresponding LBT radio frame, the transmitting apparatus may reserve or use the channel of the unlicensed radio frequency spectrum band during part or all of the LBT radio frame. A transmitting apparatus operating according to such techniques may be referred to, in some examples, as a frame based equipment (FBE). When the CCA indicates that the channel is not available (e.g., that the channel is in use or reserved by another apparatus), the transmitting apparatus may be prevented from using the channel during the LBT radio frame.

In many cases the probability of a CCA failing is relatively small, particularly when various channel selection, load-based equipment (LBE) or FBE techniques are implemented. In certain cases, however, the probability that a CCA may fail may be relatively high, such as when a particular wireless device 115 may be in a congested area or relatively close to other transmitters that are seeking to access the contention-based channel. In such cases, failure of multiple CCAs may result in certain control signals not being transmitted, which can result in throughput reduction, or even complete starvation, for the affected device. Such control signals may include a primary synchronization signal (PSS), a secondary synchronization signal (SSS), a master information block (MIB), a system information block (SIB), or a common reference signal (CRS), to provide a few examples. In such cases, various examples may provide techniques for increasing the probability of a successful CCA, such as discussed above and as will be described in more detail below for various examples.

In some cases, it may be useful for a transmitting apparatus to generate a gating interval on a periodic basis and synchronize at least one boundary of the gating interval with at least one boundary of a periodic interval. For example, it may be useful to generate a periodic gating interval for a cellular downlink in an unlicensed radio frequency spectrum band, and to synchronize at least one boundary of the periodic gating interval with at least one boundary of a periodic interval (e.g., a periodic LTE/LTE-A radio interval) associated with the cellular downlink. Examples of such synchronization are shown in FIG. 3.

Figure 3:
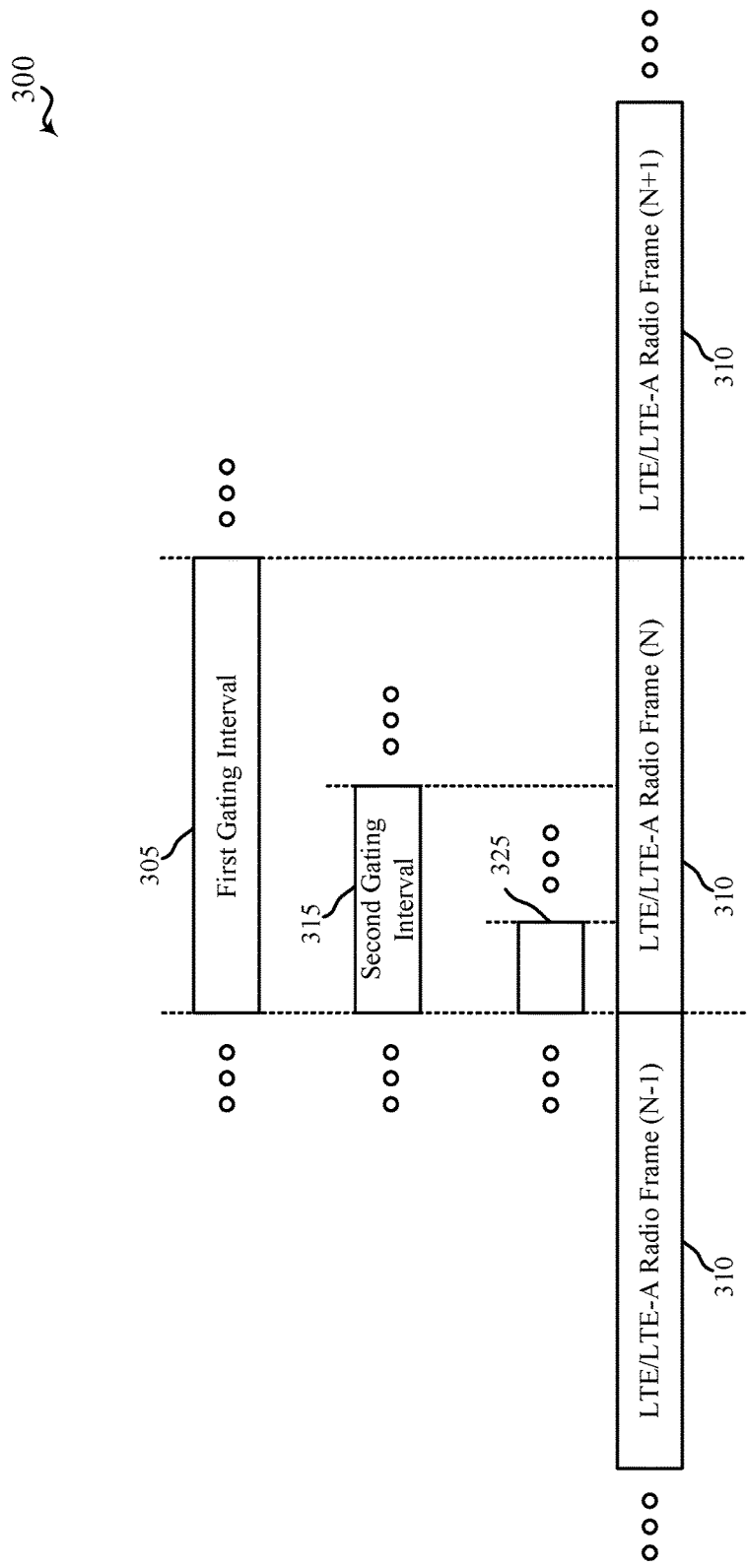
FIG. 3 shows examples of a gating interval (or LBT radio frame) for a cellular downlink in an unlicensed radio frequency spectrum band, in accordance with various aspects of the present disclosure.

FIG. 3 shows examples 300 of a gating interval (or LBT radio frame) for a cellular downlink in an unlicensed radio frequency spectrum band, in accordance with various aspects of the present disclosure. A first gating interval 305, a second gating interval 315, or a third gating interval 325 may be used as a periodic gating interval by an eNB or wireless device that supports transmissions over the unlicensed radio frequency spectrum band. Examples of such an eNB may include the base stations 105, 205, or 210 described with reference to FIG. 1 or 2, and examples of such a wireless device may include the wireless devices 115, 255, 260, 265, or 270 described with reference to FIG. 1 or 2. The first gating interval 305, the second gating interval 315, or the third gating interval 325 may in some examples be used with the wireless communication system 100 or 200 described with reference to FIG. 1 or 2.

By way of example, the duration of the first gating interval 305 is shown to be equal to (or approximately equal to) a duration of an LTE/LTE-A radio frame 310 of a periodic interval associated with a cellular downlink. In some examples, "approximately equal" means the duration of the first gating interval 305 is within a cyclic prefix (CP) duration of the duration of the periodic interval. At least one boundary of the first gating interval 305 may be synchronized with at least one boundary of the periodic interval that includes the LTE/LTE-A radio frames N−1 to N+1. In some cases, the first gating interval 305 may have boundaries that are aligned with the frame boundaries of the periodic interval. In other cases, the first gating interval 305 may have boundaries that are synchronized with, but offset from, the frame boundaries of the periodic interval. For example, the boundaries of the first gating interval 305 may be aligned with subframe boundaries of the periodic interval, or with subframe midpoint boundaries (e.g., the midpoints of particular subframes) of the periodic interval.

In some cases, the periodic interval may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

Figure 4:
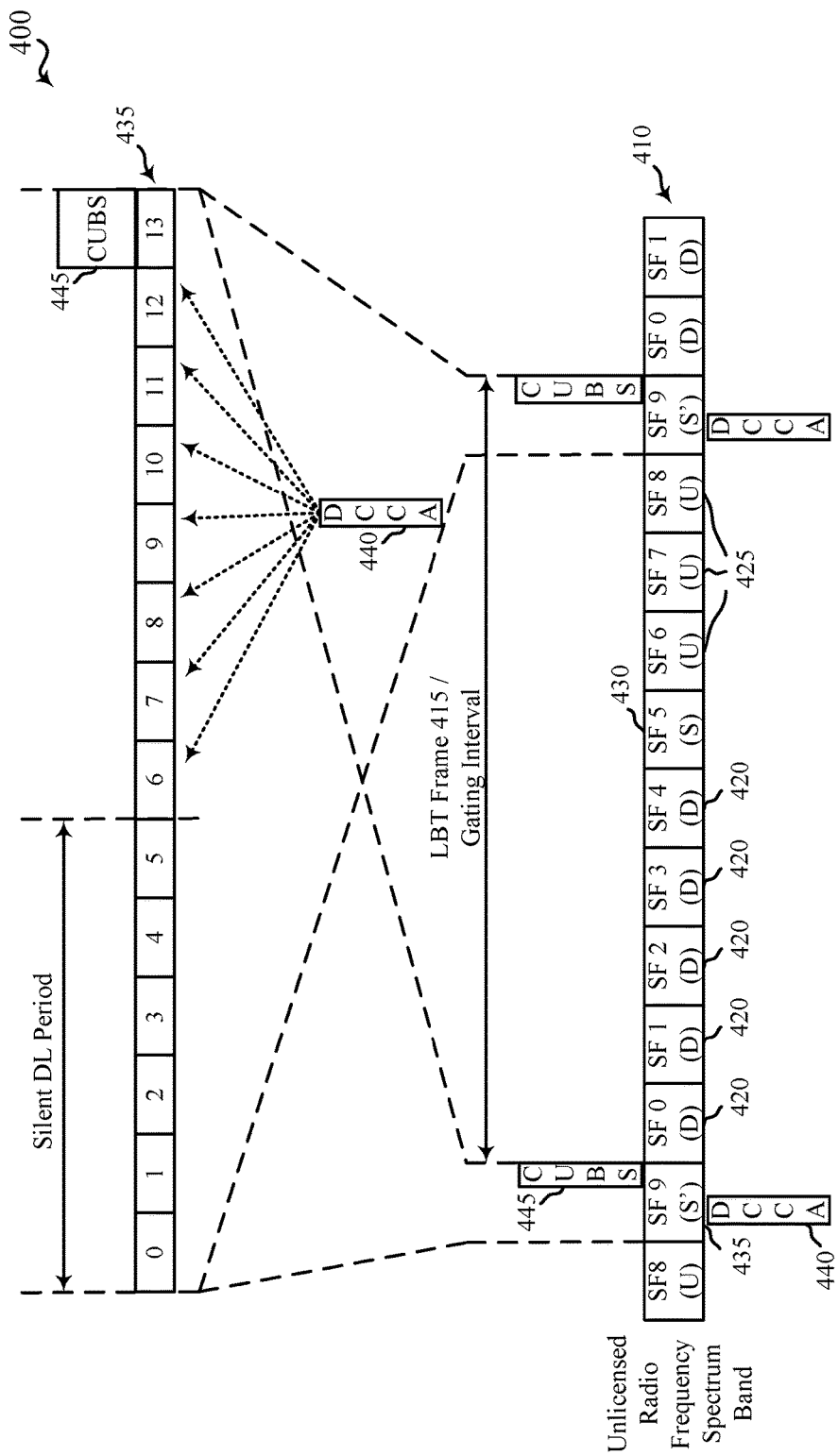
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. An LBT radio frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 535 may provide a transition between uplink subframes 425 and downlink subframes 420. During the S' subframe 435, a downlink clear channel assessment (DCCA) procedure 440 may be performed by one or more base stations, such as one or more of the base stations 105, 205, or 210 described with reference to FIG. 1 or 2, to reserve, for a period of time, the channel over which the wireless communication 410 occurs.

A DCCA procedure (as well as an uplink CCA (UCCA) procedure) may include monitoring a channel of the unlicensed radio frequency spectrum band and determining an amount of energy present on the channel. If the measured energy is below a CCA threshold, it may be determined that another device is not using the channel, and thus that the channel is available for use. If the measured energy is above the CCA threshold, it may be determined that another transmitter is transmitting using the channel, and thus that the channel is unavailable for use. The CCA threshold, in some examples, may be established according to ETSI 4.9.2.1/4.9.2.2 (Rule 5), which sets the CCA threshold level (TL) as:

$$TL = -73 + (23 - P_H) \text{dBm/MHz}$$

where $P_H$ corresponds to a maximum transmit power for the device performing the CCA. When determining TL, the device fixes $P_H$ and then computes TL. In examples that use multiple transmit antennas, a transmit mode may specify antennas to be used and whether beamforming is to be used, and in such cases $P_H$ may be set as the mean of the energy on the antennas plus any beamforming gain.

According to some examples, one or more channels may be monitored during a CCA time duration by a device (e.g., a base station or user equipment) even when the device will not perform a CCA for a particular gating interval. The device may measure channel conditions during one or multiple DCCA (or UCCA) time durations, or during other instances when the device will not be transmitting, such as during discontinuous transmission/discontinuous reception (DTX/DRX) periods. The measured channel conditions during these time periods may be used to determine one or more channel statistics, such as cumulative distribution function (CDF), for example. CDF may be used to estimate a probability that the voltage of a random data sample (x) will be less than K volts, where K may be set based on a typical TL, for example.

The channel statistics may be used to determine, for example, that the channel has a relatively high probability of being unavailable at the CCA TL. In such cases, the value of $P_H$ may be adjusted in order to increase the CCA TL, and therefore increase the probability that the CCA procedure will be successful. A device, such as a base station or user equipment, may keep a log of energy measurements on one or more channels, or on one or more antenna ports, which may be used to determine the desired statistics. Such a technique will reduce that power at which subsequent transmissions are transmitted, but will allow more transmissions based on the increased likelihood of gaining channel access. In some examples, the transmitting device may continue to transmit control signals, such as PSS, SSS, MIB, SIB, CRS, etc., at an unadjusted higher power level, and may transmit data at the lower power level. In such a manner, the control signals will have a higher likelihood of being received properly, and the data transmissions may be received at an acceptable level to provide for decoding. Devices operating in such systems may account for higher transmission power control signals when performing channel quality indicator (CQI) computations, so the lower data transmission power is accounted for in order to, for example, avoid unnecessary MCS backoff.

As mentioned, certain ETSI rules may establish a threshold level for a device to have a clear CCA and gain channel access. According to certain examples, $P_H$ may be set directly based on energy statistics and based on a measured energy during a CCA procedure. In some examples, $P_H$ may be set according to:

$$P_H = -73 + E + 23 - \Delta \text{dBm/MHz}$$

where E is the measured CCA energy and $\Delta$ is a cushion or margin to ensure the transmission will not provide undue interference with adjacent transmitting devices. In some examples, the value of $\Delta$ may be, for example, 0.5 or 1.0 dB. In such a manner, a transmitting device will always have a successful CCA, because the maximum transmit power is set to a level to provide compatible interference levels to other transmitting devices. In some examples, such a device may be set to voluntarily relinquish a transmit opportunity periodically in order to ensure fairness in channel access. Because the value of $P_H$ may be set directly based on the current measured energy (E), the MCS for the associated transmission may be changed depending upon CCA outcome. In order to reduce hardware delays in such situations, some examples may use CCA energy statistics, such as discussed above, which may be kept and may be used in conjunction with CQI information to select multiple different MCSs that may be likely for a transmission. Multiple packets may be prepared, one for each MCS, and a packet that is transmitted may be selected based on the CCA outcome. In other examples, one packet may be prepared with unequal error protection (UEP), with the amount of decoded data dependent upon the determined transmit power.

In still further examples, a transmitting device may include multiple transmit antennas. In some examples, channel conditions may be monitored for multiple antennas and statistics may be determined based on measured channel conditions. When performing a CCA, the device may pick one or more antennas for CCA performance based on which antenna(s) are determined to be the most likely to pass CCA. In some examples, such multiple antenna channel conditions may be used in relatively low mobility situations having relatively low Doppler characteristics. In other examples, one or more antennas may be selected based on a current CCA energy measurement on each of the available antennas.

With continuing reference to FIG. 4, following a successful DCCA procedure 440 by a base station, the base station may transmit a channel usage beacon signal (CUBS) 445 to provide an indication to other base stations or apparatuses (e.g., wireless devices, Wi-Fi access points, etc.) that the base station has reserved the channel. The CUBS 445 may not only reserve the channel for transmissions by the base station, but for uplink transmissions by its UEs.

The S' subframe 435 may include 14 orthogonal frequency-division multiplexing (OFDM) symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a wireless device may transmit some amount of uplink data during the silent DL period. A second portion of the S' subframe 435 may be used for the DCCA procedure 440. In the example 400, the S' subframe 435 includes seven DCCA slots, included in symbols 6 through 12. Use of the DCCA slots by different network operators may be coordinated to provide more efficient system operation. In some examples, when a device measures channel conditions during CCA time durations, such measurements may be taken during DCCA (or UCCA) slots that are identified for use by the device.

Figure 5:
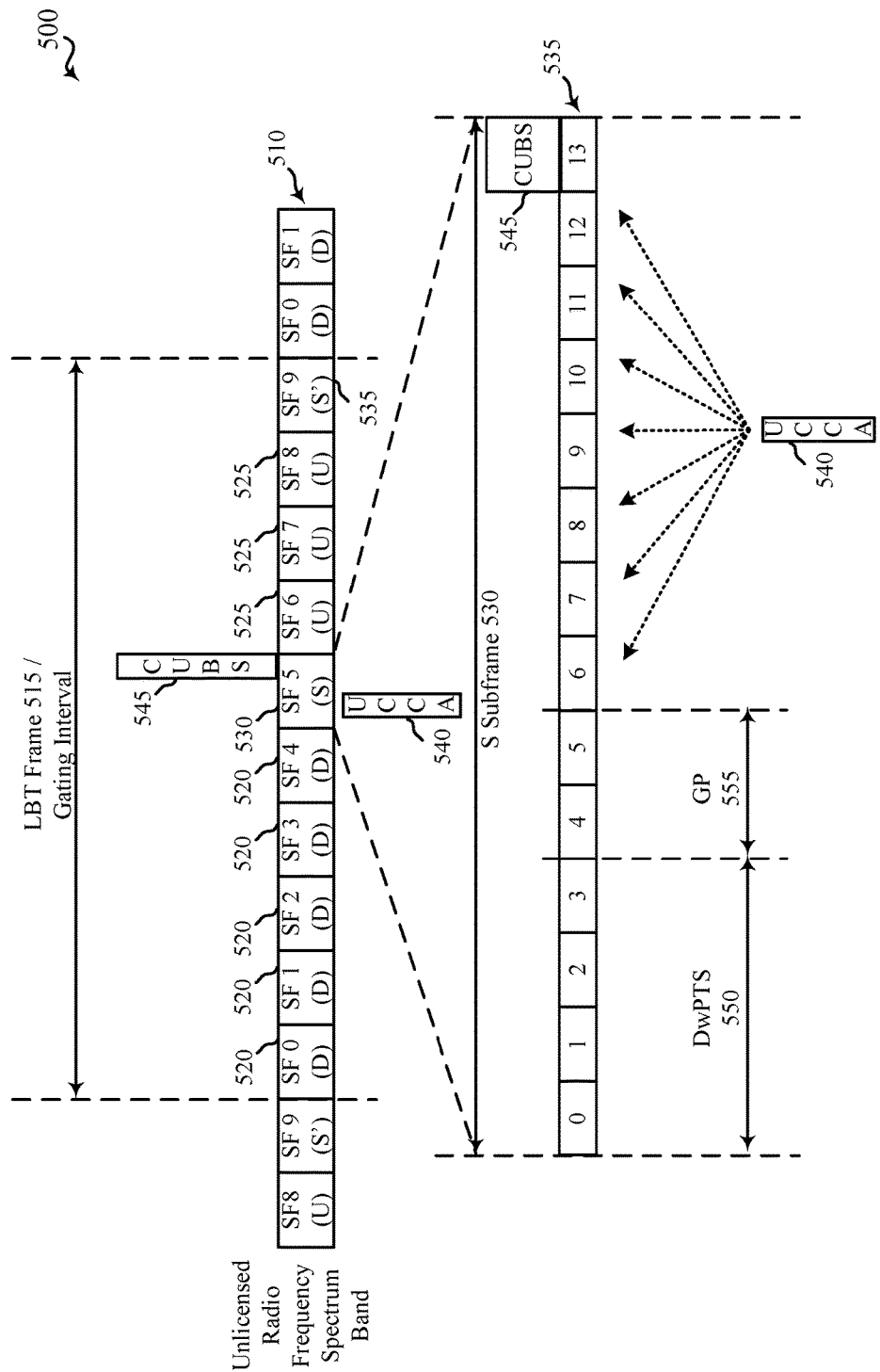
FIG. 5 shows an example of a wireless communication over an unlicensed radio frequency spectrum band, in accordance with various aspects of the present disclosure.

FIG. 5 shows an example 500 of uplink wireless communication 510 over an unlicensed radio frequency spectrum band, in accordance with various aspects of the present disclosure. An LBT radio frame 515, which may correspond to a gating interval such as the first gating interval 305 described with reference to FIG. 3 or the LBT radio frame 415 described with reference to FIG. 4, may have a duration of ten milliseconds and include a number of downlink subframes 520, a number of uplink subframes 525, and two types of special subframes (e.g., an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S subframe 530, an uplink CCA (UCCA) procedure 540 may be performed by one or more wireless devices, such as one or more of the wireless devices 115, 255, 260, 265, or 270 described above with reference to FIG. 1 or 2, to reserve, for a period of time, the channel over which the uplink wireless communication 510 occurs. Following a successful UCCA procedure 540 by a wireless device, the wireless device may transmit a CUBS 545 to provide an indication to other wireless devices or apparatuses (e.g., base stations, Wi-Fi access points, etc.) that the wireless device has reserved the channel. In some examples, CCA techniques such as discussed above with respect to FIG. 4 may be used to set transmit power limits and CCA threshold levels.

Similarly as with the downlink CCA, the S subframe 530 may include 14 OFDM symbols, numbered 0 through 13 in FIG. 5. A first portion of the S subframe 530, symbols 0 through 3 in this example, may be used as a downlink pilot time slot (DwPTS) 550, and a second portion of the S subframe 530 may be used as a guard period (GP) 555. A third portion of the S subframe 530 may be used for UCCA procedure 540. In the example 500, the S subframe 530 includes seven UCCA slots, included in symbols 6 through 12. Use of the UCCA slots by different wireless devices may be coordinated to provide more efficient system operation.

Figure 6:
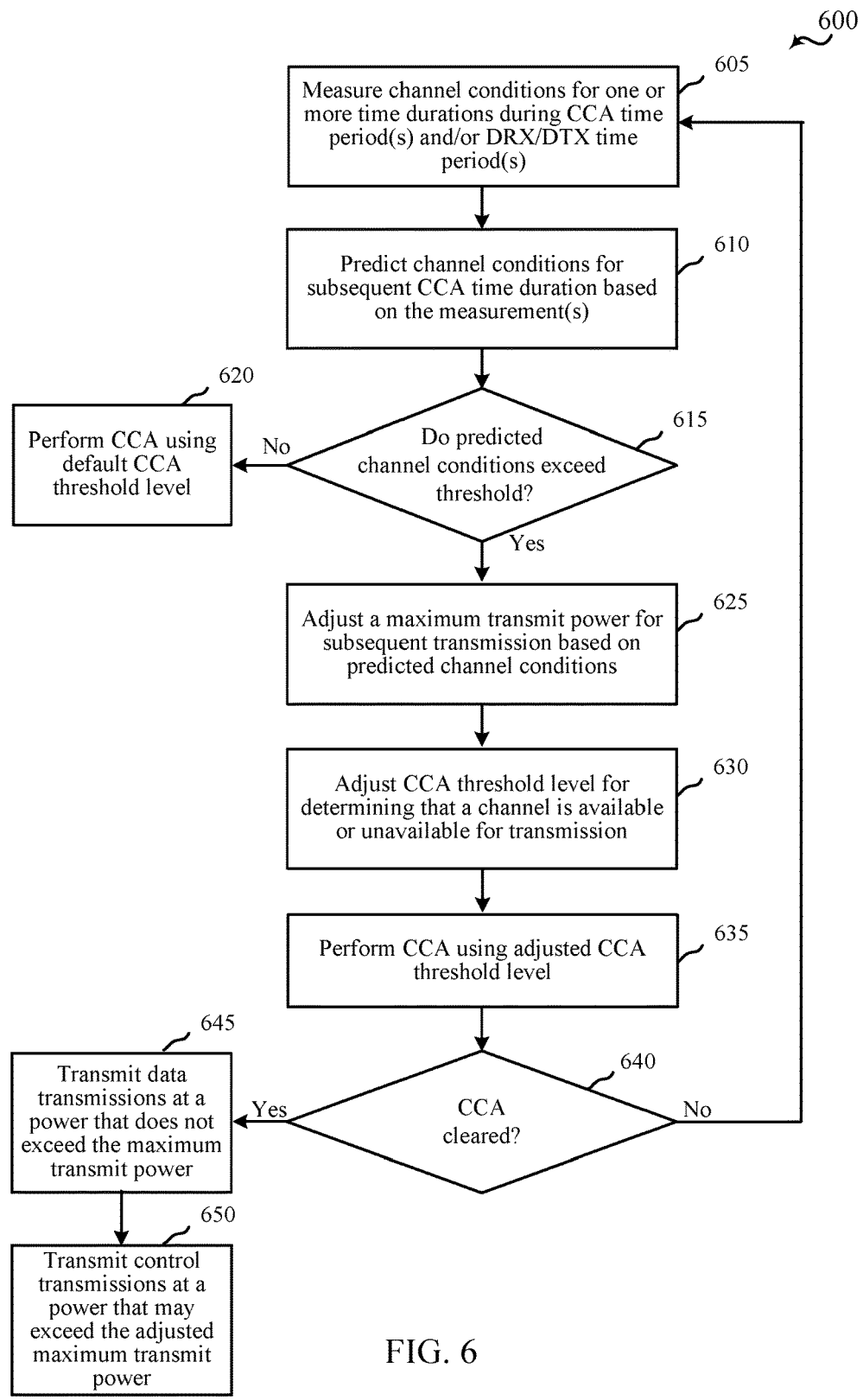
FIG. 6 is a flow chart illustrating an example of a method for wireless communication, in accordance with various aspects of the present disclosure.

FIG. 6 is a flow chart illustrating an example of a method 600 for wireless communication, in accordance with various aspects of the present disclosure. For clarity, the method 600 is described below with reference to aspects of one or more of the base stations 105, 205, or 210, or wireless devices 115, 255, 260, 265, or 270 described with reference to FIG. 1 or 2. In some examples a base station or wireless device may execute one or more sets of codes to control the functional elements of the base station or wireless device to perform the functions described below.

At block 605, the method 600 may include measuring channel conditions for one or more time durations during CCA time period(s) or DRX/DTX time period(s). At block 610, channel conditions may be predicted for a subsequent CCA time duration based on the measurement(s). At block 615, it is determined whether the predicted channel conditions exceed a threshold. For example, if the predicted channel conditions indicate that the channel is likely to have an energy above a CCA threshold limit, it may be determined that the predicted channel conditions exceed the threshold.

If the predicted channel conditions do not exceed the threshold in the determination of block 615, CCA is performed using a default CCA threshold level, as indicated at block 630. Such a default CCA threshold level may be set, for example, based on a maximum power headroom of the transmitting device. If the predicted channel conditions do exceed the threshold in the determination of block 615, an adjustment is made to a maximum transmit power for subsequent transmission based on the predicted channel conditions, as indicated at block 625. Such an adjustment may be made to provide a calculated CCA threshold that is increased to enhance the probability of a successful CCA, for example. At block 630, an adjustment is made to the CCA threshold level for determining that a channel is available or unavailable for transmission. At block 635, a CCA is performed using the adjusted CCA threshold level.

At block 640, it is determined if the CCA is clear, indicating that the channel is available for transmission. If the CCA does not clear, the operations at block 605 are performed. If the CCA does clear at block 640, data is transmitted at a power that does not exceed the adjusted maximum transmit power, as indicated at block 645. At block 650, control signals are transmitted at a power that may exceed the adjusted maximum transmit power.

Figure 7:
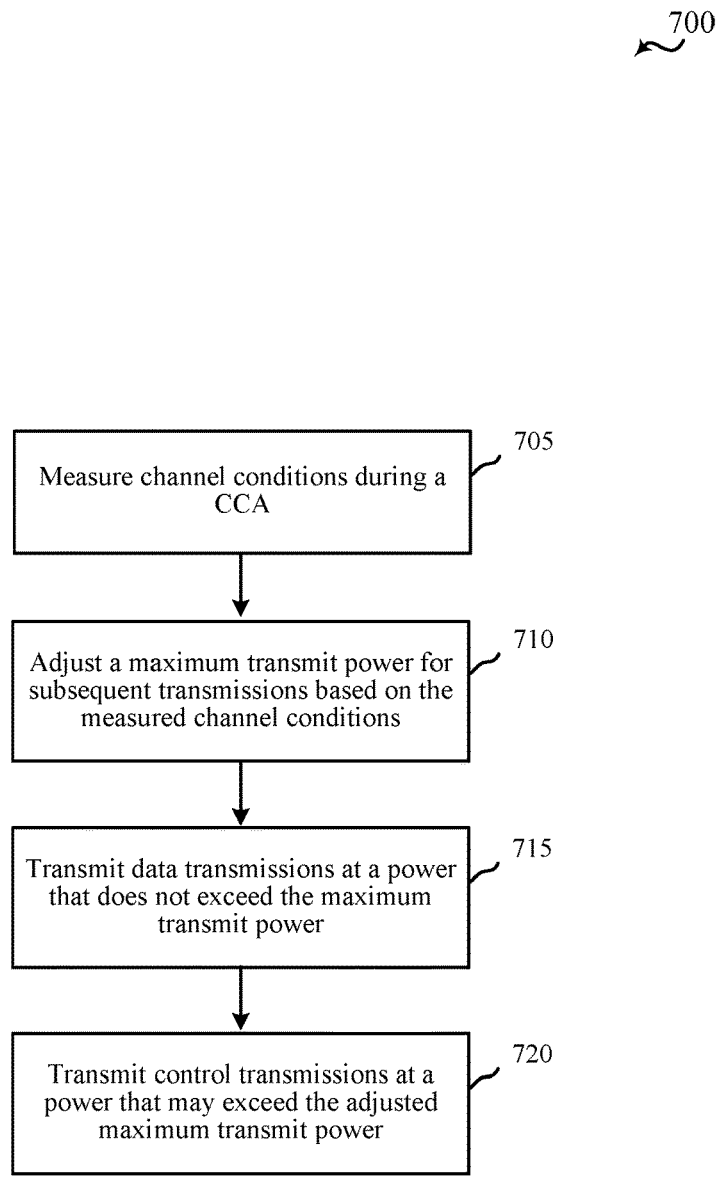
FIG. 7 is a flow chart illustrating an example of a method for wireless communication, in accordance with various aspects of the present disclosure.

FIG. 7 is a flow chart illustrating an example of a method 700 for wireless communication, in accordance with various aspects of the present disclosure. For clarity, the method 700 is described below with reference to aspects of one or more of the base stations 105, 205, or 210, or wireless devices 115, 255, 260, 265, or 270 described with reference to FIG. 1 or 2. In some examples a base station or wireless device may execute one or more sets of codes to control the functional elements of the base station or wireless device to perform the functions described below.

At block 705, the method 700 may include measuring channel conditions during a CCA procedure. At block 710, a maximum transmit power is adjusted for a subsequent transmission based on the measured channel conditions. At block 715, data is transmitted at a power that does not exceed the adjusted maximum transmit power. At block 720, control signals are transmitted at a power that may exceed the adjusted maximum transmit power. In such a manner, control signals may be transmitted at a power that enhances the likelihood of proper reception and decoding, while data signals are transmitted at the power level compatible for interference purposes with other devices that may be transmitting using the channel.

Figure 8:
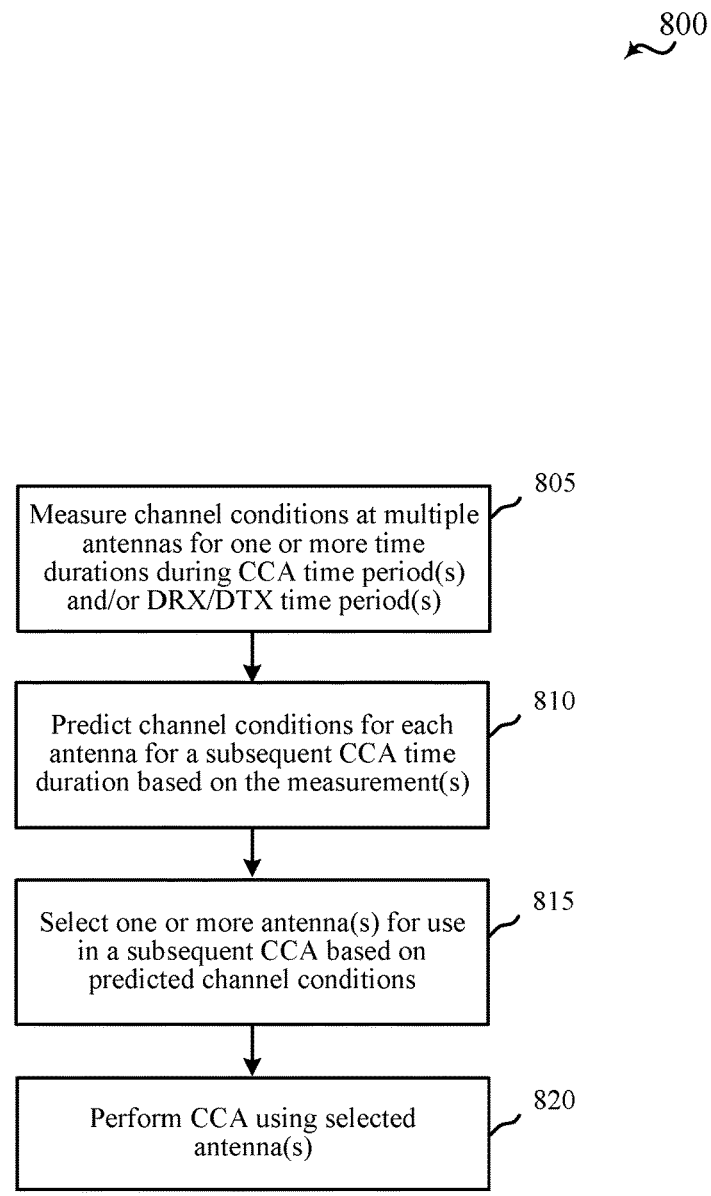
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure, in which a transmitting device may include multiple antennas. For clarity, the method 800 is described below with reference to aspects of one or more of the base stations 105, 205, or 210, wireless devices 115, 255, 260, 265, or 270 described with reference to FIG. 1 or 2. In some examples a base station or wireless device may execute one or more sets of codes to control the functional elements of the base station or wireless device to perform the functions described below.

At block 805, the method 800 may include measuring channel conditions at multiple antennas for one or more time durations during CCA time period(s) or DRX/DTX time period(s). At block 810, the method includes predicting channel conditions for each antenna for a subsequent CCA time duration based on the measurement(s). Such predictions may be based on statistics associated with the channel measurements, such as discussed above. At block 815, the device may select one or more antenna(s) for use in a subsequent CCA based on predicted channel conditions. At block 820 CCA is performed using selected antenna(s). In such a manner, the likelihood of a successful CCA may be increased through the selection of one or more antennas having more favorable channel conditions.

Figure 9:
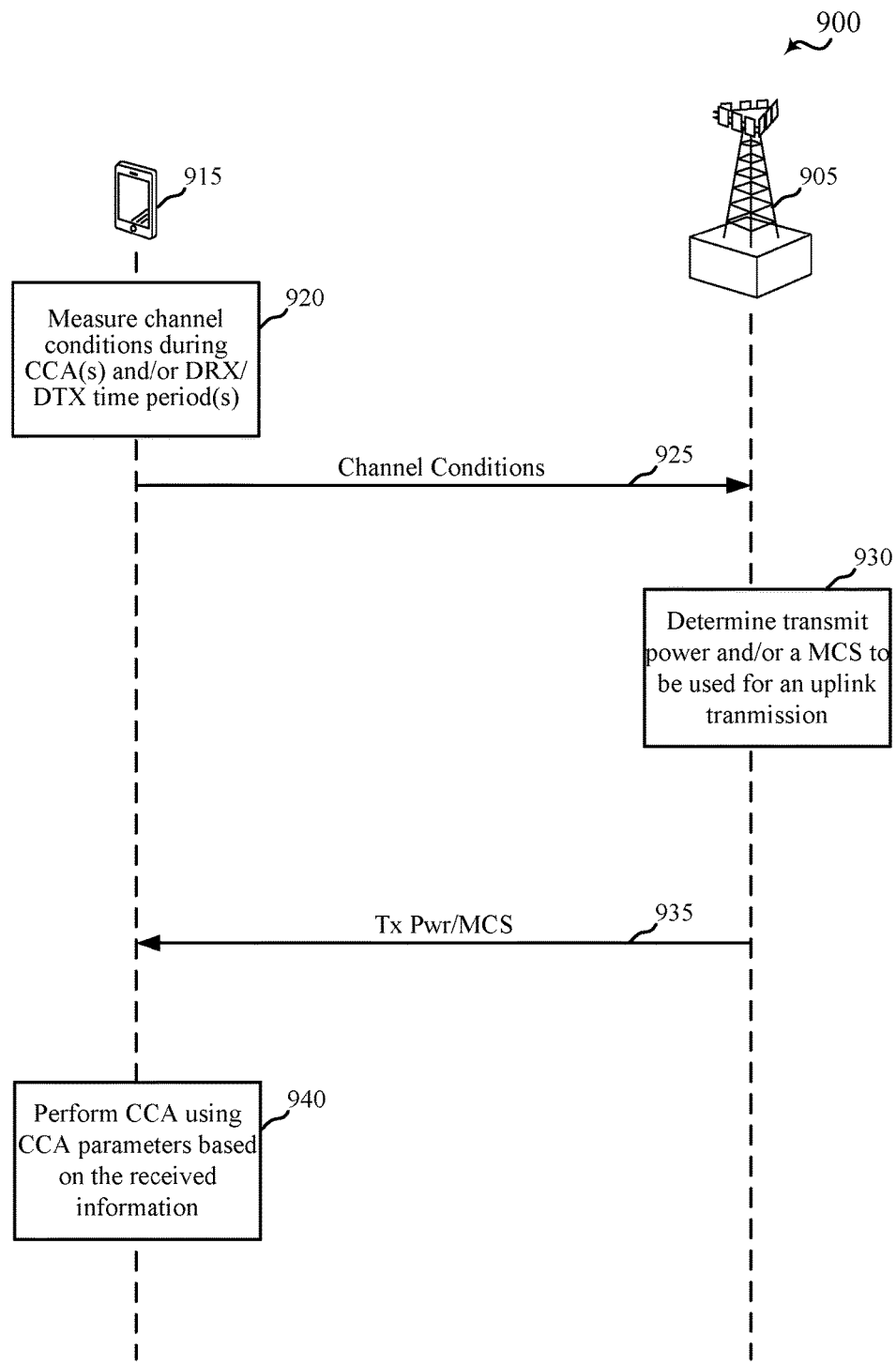
FIG. 9 shows a message flow between a base station (e.g., a base station forming part or all of an eNB) and a wireless device, in accordance with various aspects of the present disclosure.

FIG. 9 shows a message flow 900 between a base station 905 (e.g., a base station forming part or all of an eNB) and a wireless device 915, in accordance with various aspects of the present disclosure. In some examples, the base station 905 may be an example of aspects of one or more of the base stations 105, 205, or 210 described with reference to FIG. 1 or 2, and the wireless device 915 may be an example of aspects of one or more of the wireless devices 115, 255, 260, 265, or 270 described with reference to FIG. 1 or 2. In some examples, the base station 905 and wireless device 915 may be configured to communicate in a supplemental downlink mode, a carrier aggregation mode, or a standalone mode over an unlicensed radio frequency spectrum band (e.g., a radio frequency spectrum band for which apparatuses may need to contend for access because the radio frequency spectrum band is available, at least in part, for unlicensed use, such as Wi-Fi use).

In some examples, the message flow 900 may begin with the wireless device 915 measuring channel conditions for one or more time durations during CCA time period(s) or DRX/DTX time period(s). A transmission 925 of the measured channel conditions, or statistics related to the measured channel conditions, is transmitted from the wireless device 915 to the base station 905. The base station 905 may determine, as indicated at 930, transmit power or a MCS to be used for an uplink transmission of the wireless device 915. The base station 905 may send a transmission 935 of the determined transmit power or MCS to the wireless device 915. At block 940, the wireless device may perform CCA using CCA parameters that are determined based on the received transmit power or MCS. This information may be transmitted dynamically, or may be transmitted semi-statically. Transmissions 925 and 935 may be transmitted using a channel in an unlicensed radio frequency spectrum band, or may be transmitted in a licensed radio frequency spectrum band, similarly as discussed above.

Figure 10:
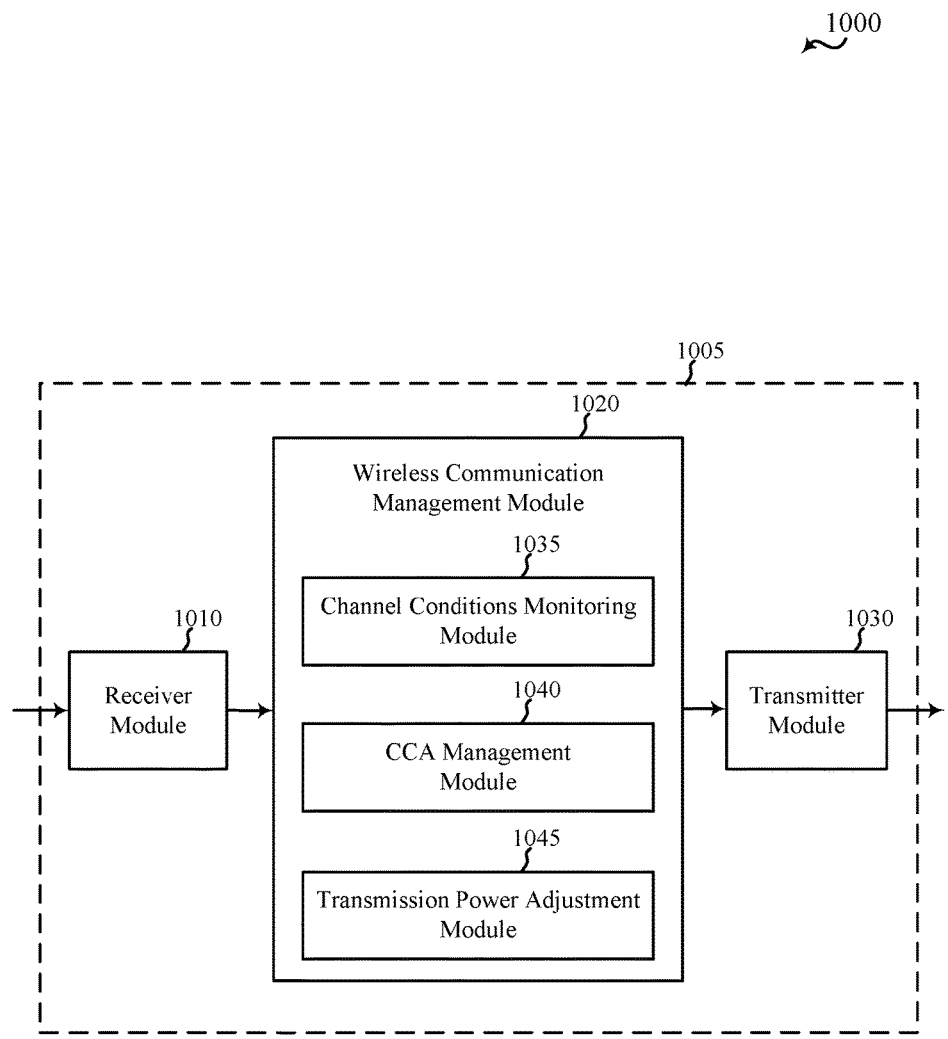
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105, 205, 210, or 905, or the apparatus may be an example of aspects of one or more of the wireless devices 115, 255, 260, 265, 270, or 915 described with reference to FIG. 1, 2, or 9. The apparatus 1005 may also be a processor. The apparatus 1005 may include a receiver module 1010, a wireless communication management module 1020, or a transmitter module 1030. Each of these components may be in communication with each other.

The components of the apparatus 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 1010 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available, at least in part, for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, or 9. The receiver module 1010 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1030 may include at least one RF transmitter, such as at least one RF transmitter operable to transmit over the licensed radio frequency spectrum band or the unlicensed radio frequency spectrum band. The transmitter module 1030 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1020 may be used to manage one or more aspects of wireless communication for the apparatus 1005. In some examples, the wireless communication management module 1020 may include a channel conditions monitoring module 1035, a CCA management module 1040, or a transmission power adjustment module 1045. Each of these components may be in communication with each other.

In some examples, the channel conditions monitoring module 1035 may be used to monitor one or more channel conditions on one or more antennas during CCA time durations or during DTX/DRX time periods, similarly as discussed above. The channel conditions monitoring module 1035 may generate statistics, such as a CDF, associated with the monitored channel(s)/antenna(s). The CCA management module 1040 may perform CCA procedures according to any of the various techniques described above, or below. The transmission power adjustment module 1045 may make adjustments to the transmit power that may be used for data or control transmission following a successful CCA, including transmission power adjustments made based on the type of data that is transmitted and based on various channel conditions or statistics provided by the channel conditions monitoring module 1035. Various of the monitored channel conditions, statistics that may be derived therefrom, CCA techniques, and transmission power adjustments are discussed for various examples above, and are not repeated here for the sake of brevity.

Figure 11:
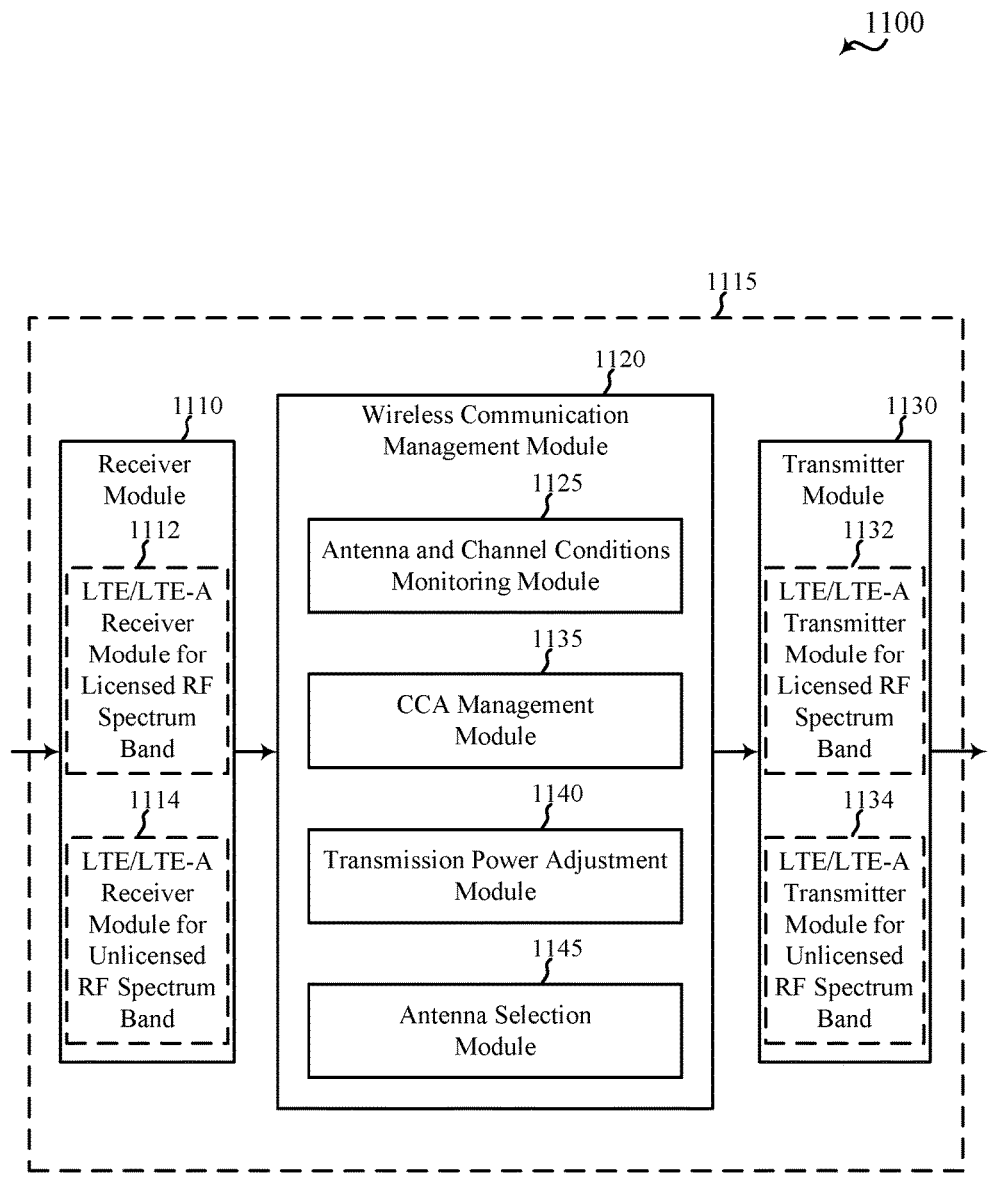
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the base stations 105, 205, 210, or 905, the apparatus may be an example of aspects of one or more of the wireless devices 115, 255, 260, 265, 270, or 915 described with reference to FIG. 1, 2, or 9, or the apparatus may be an example of aspects of the apparatus 1005 described with reference to FIG. 10. The apparatus 1105 may also be a processor. The apparatus 1105 may include a receiver module 1110, a wireless communication management module 1120, or a transmitter module 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 1110 may be an example of one or more aspects of the receiver module 1010 described with reference to FIG. 10. In some examples, the receiver module 1110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available, at least in part, for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, or 9. The receiver module 1110 may in some cases include separate receivers for the licensed radio frequency spectrum band and the unlicensed radio frequency spectrum band. The separate receivers may, in some examples, take the form of an LTE/LTE-A receiver module for licensed radio frequency spectrum band 1112, for communicating over the licensed radio frequency spectrum band, and an LTE/LTE-A receiver module for unlicensed radio frequency spectrum band 1114, for communicating over the unlicensed radio frequency spectrum band. The receiver module 1110 may also include receiver modules for communicating over other radio frequency spectrum bands or for communicating via other radio access technologies (e.g., Wi-Fi). The receiver module 1110, including the LTE/LTE-A receiver module for licensed radio frequency spectrum band 1112 and the LTE/LTE-A receiver module for unlicensed radio frequency spectrum band 1114 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1130 may include at least one RF transmitter, such as at least one RF transmitter operable to transmit over the licensed radio frequency spectrum band or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of an LTE/LTE-A transmitter module for licensed radio frequency spectrum band 1132, for communicating over the licensed radio frequency spectrum band, and an LTE/LTE-A transmitter module for unlicensed radio frequency spectrum band 1134, for communicating over the unlicensed radio frequency spectrum band. The transmitter module 1130 may also include transmitter modules for communicating over other radio frequency spectrum bands or for communicating via other radio access technologies (e.g., Wi-Fi). The transmitter module 1130, including the LTE/LTE-A transmitter module for licensed radio frequency spectrum band 1132 and the LTE/LTE-A transmitter module for unlicensed radio frequency spectrum band 1134 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1120 may be used to manage one or more aspects of wireless communication for the apparatus 1105. In some examples, the wireless communication management module 1120 may be an example of one or more aspects of the wireless communication management module 1020 described with reference to FIG. 10. In some examples, the wireless communication management module 1120 may include an antenna and channel conditions monitoring module 1125, a CCA management module 1135, a transmission power adjustment module 1140, or an antenna selection module 1145. Each of these components may be in communication with each other.

In some examples, the channel conditions monitoring module 1035 may be used to monitor one or more channel conditions on one or more antennas during CCA time durations or during DTX/DRX time periods, similarly as discussed above. The channel conditions monitoring module 1035 may generate statistics, such as a CDF, associated with the monitored channel(s)/antenna(s). The CCA management module 1040 may perform CCA procedures according to any of the various techniques described above, or below. The transmission power adjustment module 1045 may make adjustments to the transmit power that may be used for data or control transmission following a successful CCA, including transmission power adjustments made based on the type of data that is transmitted and based on various channel conditions or statistics provided by the antenna and channel conditions monitoring module 1035. The antenna selection module 1145 may determine which of one or more antennas are to be used for both a CCA procedure and subsequent data or control transmissions, based on information provided by the antenna and channel conditions monitoring module 1035. Various of the monitored channel conditions, statistics that may be derived therefrom, CCA techniques, transmission power adjustments, and antenna selection are discussed for various examples above, and are not repeated here for the sake of brevity.

Figure 12:
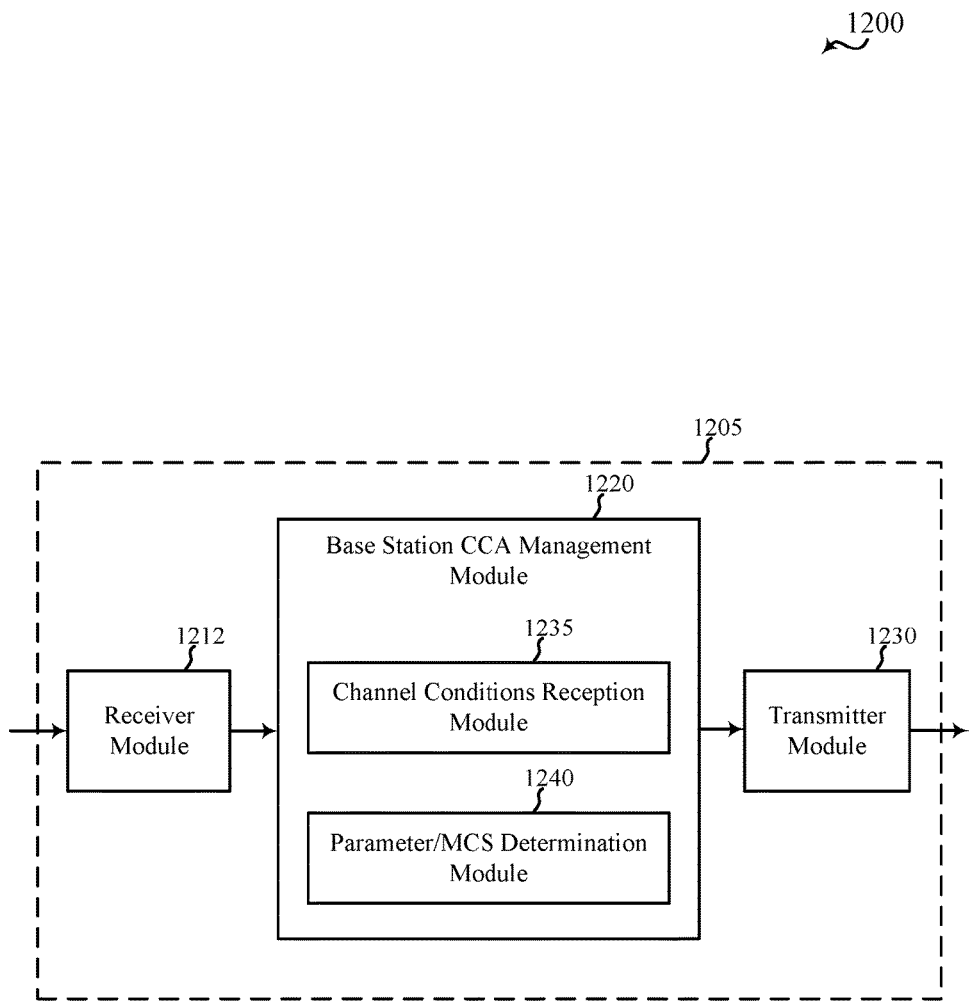
FIG. 12 shows a block diagram of another apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base stations 105, 205, 210, or 905 described with reference to FIG. 1, 2, or 9. The apparatus 1205 may also be a processor. The apparatus 1205 may include a receiver module 1210, a base station CCA management module 1220, or a transmitter module 1230. Each of these components may be in communication with each other.

The components of the apparatus 1205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 1210 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available, at least in part, for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, or 9. The receiver module 1210 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1230 may include at least one RF transmitter, such as at least one RF transmitter operable to transmit over the licensed radio frequency spectrum band or the unlicensed radio frequency spectrum band. The transmitter module 1230 may be used to transmit various types of data or control signals (i.e., transmissions) over one or more communication links of a wireless communication system, such as one or more communication links of the wireless communication system 120 or 200 described with reference to FIG. 1 or 2. The communication links may be established over the licensed radio frequency spectrum band or the unlicensed radio frequency spectrum band.

In some examples, the base station CCA management module 1220 may be used to manage one or more aspects of wireless communication for the apparatus 1205. In some examples, the base station CCA management module 1220 may include a channel conditions reception module 1235, or a parameter/MCS determination module 1240. Each of these components may be in communication with each other.

In some examples, the channel conditions reception module 1235 may be used to receive channel conditions that are transmitted from a wireless device, which may correspond to one or more channel conditions on one or more antennas during CCA time durations or during DTX/DRX time periods, similarly as discussed above. The parameter/MCS determination module 1240 may make adjustments to parameters or MCS that are to be used by a wireless device for a subsequent transmission. Various of the monitored channel conditions, statistics that may be derived therefrom, and parameter/MCS adjustments are discussed for various examples above, and are not repeated here for the sake of brevity.

Figure 13:
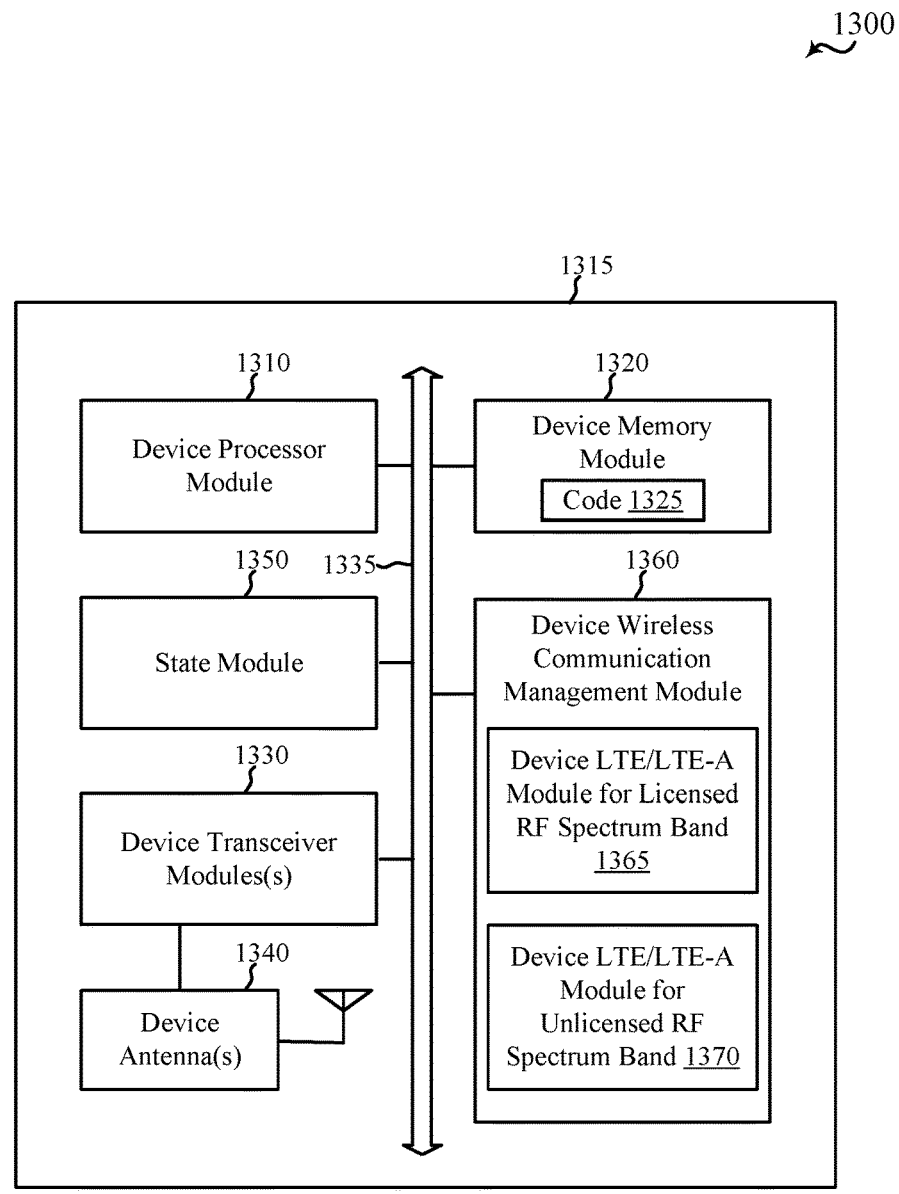
FIG. 13 shows a block diagram of a wireless device (e.g., a UE capable of communicating with one or more base stations) for use in wireless communication, in accordance with various aspects of the present disclosure.

FIG. 13 shows a block diagram 1300 of a wireless device 1315 (e.g., a UE capable of communicating with one or more base stations) for use in wireless communication, in accordance with various aspects of the present disclosure. The wireless device 1315 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The wireless device 1315 may, in some examples, have an internal power supply (not shown), such as a small battery, to facilitate mobile operation. In some examples, the wireless device 1315 may be an example of aspects of one or more of the wireless devices 115, 255, 260, 265, 270, or 915 described with reference to FIG. 1, 2, or 9, or aspects of one or more of the apparatuses 1005 or 1105 described with reference to FIG. 10 or 11. The wireless device 1315 may be configured to implement at least some of the wireless device features and functions described with reference to FIG. 1, 2, 3, 4, 5, 6, 7, 8, 9, 10, or 11.

The wireless device 1315 may include a device processor module 1310, a device memory module 1320, at least one device transceiver module (represented by device transceiver module(s) 1330), at least one device antenna (represented by device antenna(s) 1340), or a device wireless communication management module 1360. Each of these components may be in communication with each other, directly or indirectly, over one or more buses 1335.

The device memory module 1320 may include random access memory (RAM) or read-only memory (ROM). The device memory module 1320 may store computer-readable, computer-executable code 1325 containing instructions that are configured to, when executed, cause the device processor module 1310 to perform various functions described herein related to wireless communication, including, for example, the performance of CCA. Alternatively, the code 1325 may not be directly executable by the device processor module 1310 but be configured to cause the wireless device 1315 (e.g., when compiled and executed) to perform various of the functions described herein.

The device processor module 1310 may include an intelligent hardware device, e.g., a CPU, a microcontroller, an ASIC, etc. The device processor module 1310 may process information received through the device transceiver module(s) 1330 or information to be sent to the device transceiver module(s) 1330 for transmission through the device antenna(s) 1340. The device processor module 1310 may handle, alone or in connection with the device wireless communication management module 1360, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., an unlicensed radio frequency spectrum band for which apparatuses may need to contend for access because the radio frequency spectrum band is available for unlicensed use, such as Wi-Fi use).

The device transceiver module(s) 1330 may include a modem configured to modulate packets and provide the modulated packets to the device antenna(s) 1340 for transmission, and to demodulate packets received from the device antenna(s) 1340. The device transceiver module(s) 1330 may, in some examples, be implemented as one or more device transmitter modules and one or more separate device receiver modules. The device transceiver module(s) 1330 may support communications in the first radio frequency spectrum band or the second radio frequency spectrum band. The device transceiver module(s) 1330 may be configured to communicate bi-directionally, via the device antenna(s) 1340, with one or more of the base stations 105, 205, 210, or 605 described with reference to FIG. 1, 2, or 6. While the wireless device 1315 may include a single device antenna, there may be examples in which the wireless device 1315 may include multiple device antennas 1340.

The device state module 1350 may be used, for example, to manage transitions of the wireless device 1315 between a radio resource control (RRC) idle state and an RRC connected state, and may be in communication with other components of the wireless device 1315, directly or indirectly, over the one or more buses 1335. The device state module 1350, or portions of it, may include a processor, or some or all of the functions of the device state module 1350 may be performed by the device processor module 1310 or in connection with the device processor module 1310.

The device wireless communication management module 1360 may be configured to perform or control some or all of the features or functions described with reference to FIG. 1, 2, 3, 4, 5, 6, 7, 8, 9, 10, 11, or 12 related to wireless communication over the first radio frequency spectrum band or the second radio frequency spectrum band. For example, the device wireless communication management module 1360 may be configured to support a supplemental downlink mode, a carrier aggregation mode, or a standalone mode using the first radio frequency spectrum band or the second radio frequency spectrum band. The device wireless communication management module 1360 may include a device LTE/LTE-A module for licensed radio frequency spectrum band 1365, configured to handle LTE/LTE-A communications in the first radio frequency spectrum band, and a device LTE/LTE-A module for unlicensed radio frequency spectrum band 1370, configured to handle LTE/LTE-A communications in the second radio frequency spectrum band. The device wireless communication management module 1360, or portions of it, may include a processor, or some or all of the functions of the device wireless communication management module 1360 may be performed by the device processor module 1310 or in connection with the device processor module 1310. In some examples, the device wireless communication management module 1360 may be an example of the wireless communication management module 1020 or 1120 described with reference to FIG. 10 or 11.

Figure 14:
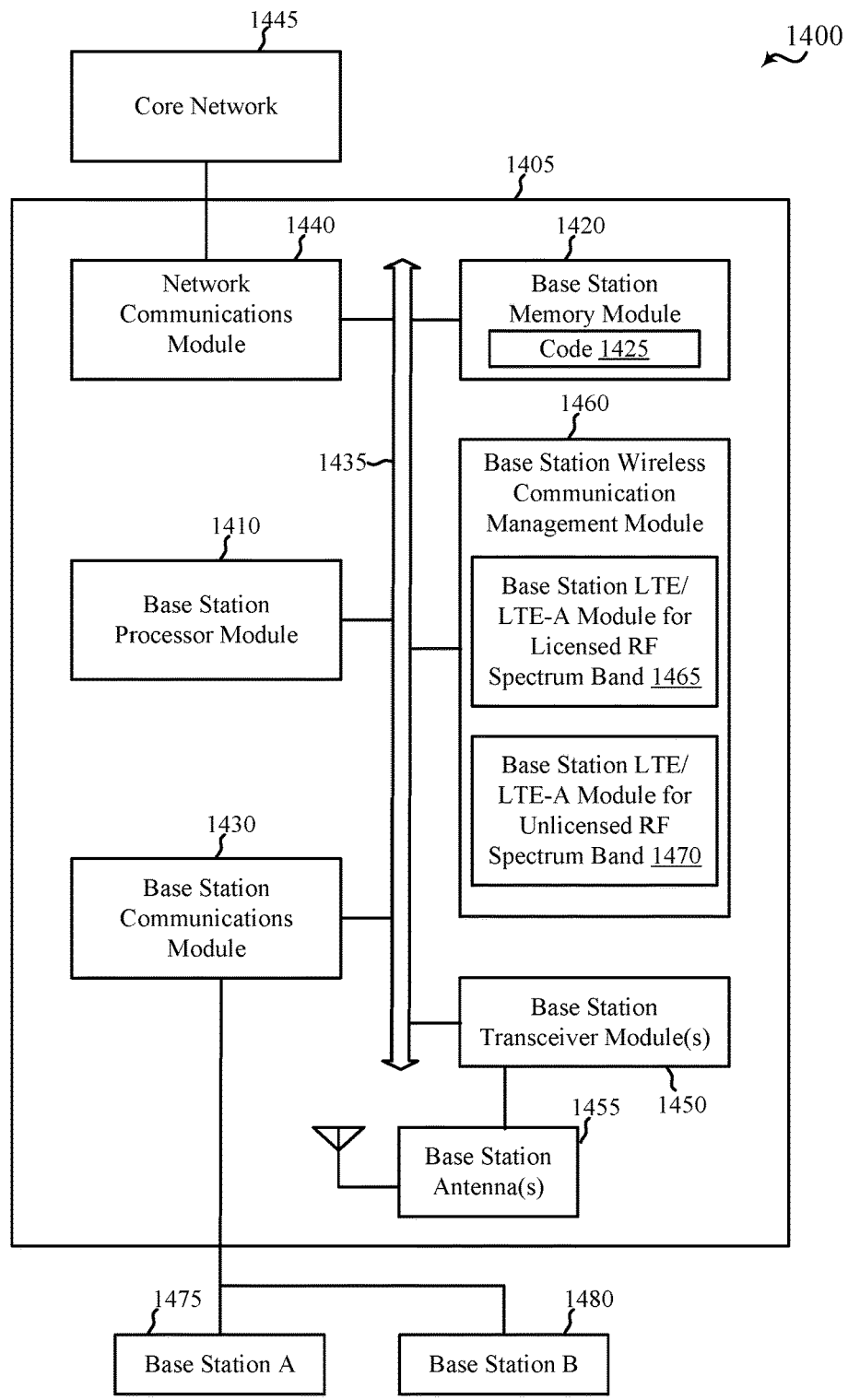
FIG. 14 shows a block diagram of a base station (e.g., a base station forming part or all of an eNB) for use in wireless communication, in accordance with various aspects of the present disclosure.

FIG. 14 shows a block diagram 1400 of a base station 1405 (e.g., a base station forming part or all of an eNB) for use in wireless communication, in accordance with various aspects of the present disclosure. In some examples, the base station 1405 may be an example of one or more aspects of the base station 105, 205, 210, 905 or 1205 described with reference to FIG. 1, 2, 9 or 12. The base station 1405 may be configured to implement or facilitate at least some of the base station features and functions described with reference to FIG. 1, 2, 3, 4, 5, 6, 7, 8, or 9.

The base station 1405 may include a base station processor module 1410, a base station memory module 1420, at least one base station transceiver module (represented by base station transceiver module(s) 1450), at least one base station antenna (represented by base station antenna(s) 1455), or a base station wireless communication management module 1460. The base station 1405 may also include one or more of a base station communications module 1430 or a network communications module 1440. Each of these components may be in communication with each other, directly or indirectly, over one or more buses 1435.

The base station memory module 1420 may include RAM or ROM. The base station memory module 1420 may store computer-readable, computer-executable code 1425 containing instructions that are configured to, when executed, cause the base station processor module 1410 to perform various functions described herein related to wireless communication, including, for example, the scheduling of uplink transmissions. Alternatively, the code 1425 may not be directly executable by the base station processor module 1410 but be configured to cause the base station 1405 (e.g., when compiled and executed) to perform various of the functions described herein.

The base station processor module 1410 may include an intelligent hardware device, e.g., a central processing unit (CPU), a microcontroller, an ASIC, etc. The base station processor module 1410 may process information received through the base station transceiver module(s) 1450, the base station communications module 1430, or the network communications module 1440. The base station processor module 1410 may also process information to be sent to the transceiver module(s) 1450 for transmission through the antenna(s) 1455, to the base station communications module 1430, for transmission to one or more other base stations 1475 and 1480, or to the network communications module 1440 for transmission to a core network 1445, which may be an example of one or more aspects of the core network 130 described with reference to FIG. 1. The base station processor module 1410 may handle, alone or in connection with the base station wireless communication management module 1460, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., an unlicensed radio frequency spectrum band for which apparatuses may need to contend for access because the radio frequency spectrum band is available for unlicensed use, such as Wi-Fi use).

The base station transceiver module(s) 1450 may include a modem configured to modulate packets and provide the modulated packets to the base station antenna(s) 1455 for transmission, and to demodulate packets received from the base station antenna(s) 1455. The base station transceiver module(s) 1450 may, in some examples, be implemented as one or more base station transmitter modules and one or more separate base station receiver modules. The base station transceiver module(s) 1450 may support communications in the first radio frequency spectrum band or the second radio frequency spectrum band. The base station transceiver module(s) 1450 may be configured to communicate bi-directionally, via the antenna(s) 1455, with one or more wireless devices or apparatuses, such as one or more of the wireless devices 115, 255, 260, 265, 270, 915, or 1315 described with reference to FIG. 1, 2, 9, or 13, or one or more of the apparatuses 1005 or 1105 described with reference to FIG. 10 or 11. The base station 1405 may, for example, include multiple base station antennas 1455 (e.g., an antenna array). The base station 1405 may communicate with the core network 1445 through the network communications module 1440. The base station 1405 may also communicate with other base stations, such as the base stations 1475 and 1480, using the base station communications module 1430.

The base station wireless communication management module 1460 may be configured to perform or control some or all of the features or functions described with reference to FIG. 1, 2, 3, 4, 5, 6, 7, 8, or 9 related to CCA operations. The base station wireless communication management module 1460 may include a base station LTE/LTE-A module for licensed radio frequency spectrum band 1465, configured to handle LTE/LTE-A communications in the first radio frequency spectrum band, or a base station LTE/LTE-A module for unlicensed radio frequency spectrum band 1470, configured to handle LTE/LTE-A communications in the second radio frequency spectrum band. The base station wireless communication management module 1460, or portions of it, may include a processor, or some or all of the functions of the base station wireless communication management module 1460 may be performed by the base station processor module 1410 or in connection with the base station processor module 1410.

Figure 15:
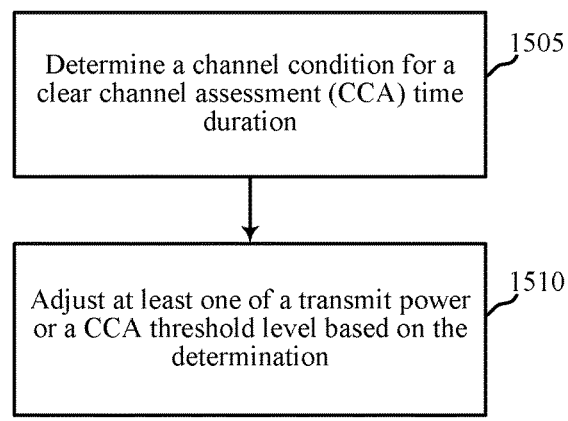
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105, 205, 210, 905, or 1405, wireless devices 115, 255, 260, 265, 270, 915, or 1315 described with reference to FIG. 1, 2, 9, 13, or 14, or aspects of one or more of the apparatuses 1005, 1105, or 1205 described with reference to FIG. 10, 11, or 12. In some examples a wireless device may execute one or more sets of codes to control the functional elements of the wireless device to perform the functions described below.

At block 1505, the method 1500 may include determining a channel condition for a clear channel assessment (CCA) time duration. The operation(s) at block 1505 may be performed using the wireless communication management module 1020, 1120, 1360, or 1460 described with reference to FIG. 10, 11, 13, or 14, or the channel conditions monitoring module 1035 or 1135 described with reference to FIG. 10, or 11.

At block 1510, the method 1500 may include adjusting at least one of a transmit power or a CCA threshold level based on the determination. The operation(s) at block 1510 may be performed using the wireless communication management modules 1020, 1120, 1220, or 1360 described with reference to FIG. 10, 11, 12, or 13.

Thus, the method 1500 may provide for wireless communication. It should be noted that the method 1500 is just one implementation and that the operations of the method 1500 may be rearranged or otherwise modified such that other implementations are possible.

Figure 16:
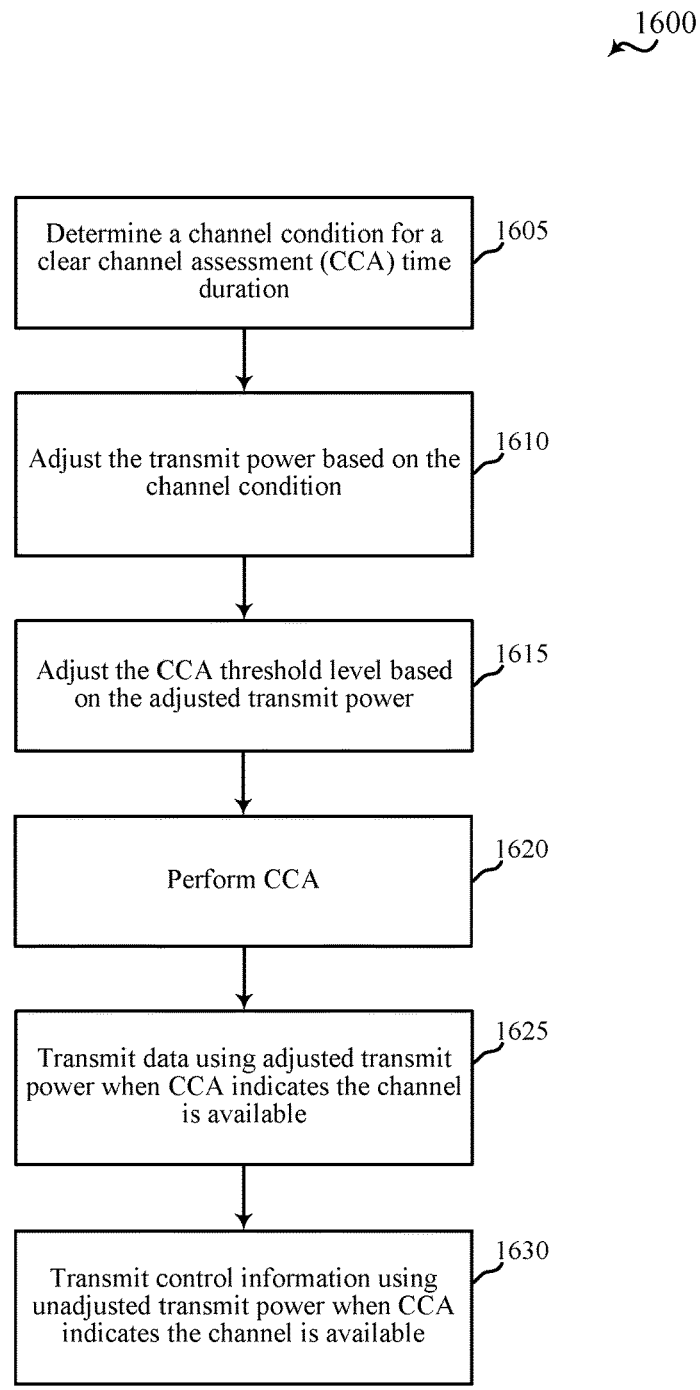
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, 205, 210, 905, or 1405, wireless devices 115, 255, 260, 265, 270, 915, or 1315 described with reference to FIG. 1, 2, 9, 13, or 14, or aspects of one or more of the apparatuses 1005, 1105, or 1205 described with reference to FIG. 10, 11, or 12. In some examples a wireless device may execute one or more sets of codes to control the functional elements of the wireless device to perform the functions described below.

At block 1605, the method 1600 may include determining a channel condition for a clear channel assessment (CCA) time duration. At block 1610, the method 1600 may include adjusting the transmit power based on the channel condition. At block 1615, the method 1600 may include adjusting the CCA threshold level based on the adjusted transmit power. At block 1620, a CCA may be performed. At block 1625, data may be transmitted using adjusted transmit power when CCA indicates the channel is available. At block 1630, control information may be transmitted using unadjusted transmit power when CCA indicates the channel is available.

Thus, the method 1600 may provide for wireless communication. It should be noted that the method 1600 is just one implementation and that the operations of the method 1600 may be rearranged or otherwise modified such that other implementations are possible.

Figure 17:
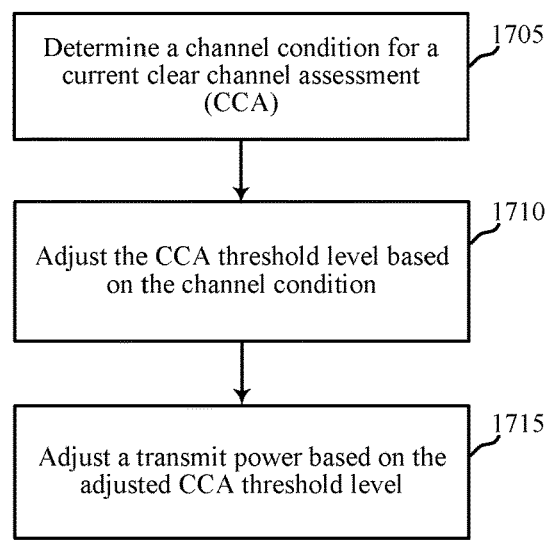
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 210, 905, or 1405, wireless devices 115, 255, 260, 265, 270, 915, or 1315 described with reference to FIG. 1, 2, 9, 13, or 14, or aspects of one or more of the apparatuses 1005, 1105, or 1205 described with reference to FIG. 10, 11, or 12. In some examples a wireless device may execute one or more sets of codes to control the functional elements of the wireless device to perform the functions described below.

At block 1705, the method 1700 may include determining a channel condition for a current clear channel assessment (CCA). At block 1710, the method 1700 may include adjusting the CCA threshold level based on the channel condition. At block 1715, the method 1700 may include adjusting a transmit power based on the adjusted CCA threshold level.

Thus, the method 1700 may provide for wireless communication. It should be noted that the method 1700 is just one implementation and that the operations of the method 1700 may be rearranged or otherwise modified such that other implementations are possible.

In some examples, aspects of one or more of the methods 1500, 1600, or 1700 described with reference to FIG. 15, 16, or 17 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication at a user equipment (UE), comprising:

measuring, by the UE, a shared channel during at least one time duration equivalent to a clear channel assessment (CCA) time duration prior to performing a CCA;

determining, by the UE, a channel condition of the shared channel during the at least one time duration based at least in part on the measuring;

adjusting, by the UE, prior to performing the CCA, at least one of a transmit power associated with a transmission from the UE following the CCA or a CCA threshold level of the CCA, wherein the adjusting is based at least in part on the determined channel condition; and performing, by the UE, the CCA based at least in part on the adjusting, wherein the CCA is performed subsequent to the at least one time duration and during an uplink OFDM symbol period identified for use.

2. The method of claim 1, wherein the adjusting comprises:

adjusting the transmit power based on the channel condition, wherein the adjusted transmit power is a maximum transmit power; and adjusting the CCA threshold level based on the adjusted transmit power.

3. The method of claim 2, further comprising:

transmitting one or more control signals using a higher transmit power than the adjusted transmit power; and transmitting data signals at the adjusted transmit power.

4. The method of claim 1, wherein the adjusting comprises:
adjusting the CCA threshold level based on the channel condition; and
adjusting the transmit power based on the adjusted CCA threshold level.

5. The method of claim 1, further comprising:
adjusting a modulation and coding scheme (MCS) based on the determined channel condition.

6. The method of claim 1, wherein the determining comprises:
monitoring the channel condition of the shared channel during a plurality of CCA time durations; and
determining an expected channel condition for a subsequent CCA time duration.

7. The method of claim 1, further comprising:
selecting at least one antenna of a plurality of antennas to be used for performing the CCA.

8. The method of claim 7, wherein performing the CCA comprises performing one or more CCAs using the selected antenna(s), the method further comprising:
determining that the shared channel is unavailable for transmission when an energy on the shared channel during the one or more CCAs exceeds the CCA threshold level; and
determining that the shared channel is available for transmission when the energy on the shared channel is less than the CCA threshold level.

9. The method of claim 7, wherein the determining comprises:
monitoring a plurality of channel conditions for each of the plurality of antennas during a plurality of CCA time durations; and
determining a plurality of expected channel conditions for each monitored antenna for a subsequent CCA time duration.

10. The method of claim 1, wherein the determining comprises:
determining at least one statistic for the channel condition based at least in part on the measuring.

11. The method of claim 10, further comprising:
transmitting the at least one statistic to a base station.

12. The method of claim 10, wherein the at least one statistic includes a cumulative distribution function (CDF).

13. The method of claim 1, further comprising:
receiving, from a base station, one or more of an adjusted transmit power, an adjusted CCA threshold, or a modulation and coding scheme (MCS) to be used for an uplink transmission, wherein the transmit power or the CCA threshold level is adjusted based at least in part on the receiving.

14. The method of claim 13, wherein the one or more adjusted transmit power, adjusted CCA threshold, or MCS are received semi-statically or dynamically.

15. An apparatus for wireless communication at a user equipment (UE), comprising:
a processor, and memory coupled to the processor, wherein the processor is configured to:
measure, by the UE, a shared channel during at least one time duration equivalent to a clear channel assessment (CCA) time duration prior to performing a CCA;
determine, by the UE, a channel condition of the shared channel during the at least one time duration based at least in part on the measuring;
adjust, by the UE, prior to performing the CCA, at least one of a transmit power associated with a transmission from the UE following the CCA or a CCA threshold level of the CCA, wherein the adjusting is based at least in part on the determined channel condition; and
perform, by the UE, the CCA based at least in part on the adjusting, wherein the CCA is performed subsequent to the at least one time duration and during an uplink OFDM symbol period identified for use.

16. The apparatus of claim 15, wherein the processor is further configured to:
transmit one or more control signals using a higher transmit power than the adjusted transmit power; and
transmit data signals at the adjusted transmit power.

17. The apparatus of claim 15, wherein the processor is further configured to:
adjust a modulation and coding scheme (MCS) based on the determined channel condition.

18. The apparatus of claim 15, wherein the processor is further configured to:
monitor the channel condition of the shared channel during a plurality of CCA time durations, and wherein determining the channel condition of the shared channel comprises determining an expected channel condition for a subsequent CCA time duration based at least in part on the monitoring.

19. The apparatus of claim 15, wherein the processor is further configured to:
select at least one antenna of a plurality of antennas to be used for performing the CCA.

20. The apparatus of claim 15, wherein the processor is further configured to:
determine at least one statistic for the channel condition based at least in part on the measuring; and
transmit the at least one statistic to a base station.

21. The apparatus of claim 15, wherein the processor is further configured to:
receive, from a base station, one or more of an adjusted transmit power, an adjusted CCA threshold, or a modulation and coding scheme (MCS) to be used for an uplink transmission, wherein the transmit power or the CCA threshold level is adjusted based at least in part on the receiving.

22. An apparatus for wireless communication at a user equipment (UE), comprising:
means for measuring, by the UE, a shared channel during at least one time duration equivalent to a clear channel assessment (CCA) time duration prior to performing a CCA;
means for determining, by the UE, a channel condition of the shared channel during the at least one time duration based at least in part on the measuring;
means for adjusting, by the UE, prior to performing the CCA, at least one of a transmit power associated with a transmission from the UE following the CCA or a CCA threshold level of the CCA, wherein the adjusting is based at least in part on the determined channel condition; and
means for performing, by the UE, the CCA based at least in part on the adjusting, wherein the CCA is performed subsequent to the at least one time duration and during an uplink OFDM symbol period identified for use.

23. The apparatus of claim 22, further comprising:
means for transmitting one or more control signals using a higher transmit power than the adjusted transmit power; and
means for transmitting data signals at the adjusted transmit power.

24. The apparatus of claim 22, further comprising:
means for adjusting a modulation and coding scheme (MCS) based on the determined channel condition.

25. The apparatus of claim 22, further comprising:
means for determining at least one statistic for the channel condition based at least in part on the measuring; and
means for transmitting the at least one statistic to a base station.

26. The apparatus of claim 22, further comprising:
means for receiving, from a base station, one or more of an adjusted transmit power, an adjusted CCA threshold, or a modulation and coding scheme (MCS) to be used for an uplink transmission, wherein the transmit power or the CCA threshold level is adjusted based at least in part on the receiving.

27. A non-transitory computer-readable medium storing computer-executable code for wireless communication at a user equipment (UE), the code executable by a processor to:
measure, by the UE, a shared channel during at least one time duration equivalent to a clear channel assessment (CCA) time duration prior to performing a CCA;
determine, by the UE, a channel condition of the shared channel during the at least one time duration based at least in part on the measuring;
adjust, by the UE, prior to performing the CCA, at least one of a transmit power associated with a transmission from the UE following the CCA or a CCA threshold level of the CCA, wherein the adjusting is based at least in part on the determined channel condition; and
perform, by the UE, the CCA based at least in part on the adjusting, wherein the CCA is performed subsequent to the at least one time duration and during an uplink OFDM symbol period identified for use.

28. The non-transitory computer-readable medium of claim 27, wherein the code is further executable by the processor to:
transmit one or more control signals using a higher transmit power than the adjusted transmit power; and
transmit data signals at the adjusted transmit power.

29. The non-transitory computer-readable medium of claim 27, wherein the code is further executable by the processor to:
determine at least one statistic for the channel condition based at least in part on the measuring; and
transmit the at least one statistic to a base station.

30. The non-transitory computer-readable medium of claim 27, wherein the code is further executable by the processor to:
receive, from a base station, one or more of an adjusted transmit power, an adjusted CCA threshold, or a modulation and coding scheme (MCS) to be used for an uplink transmission, wherein the transmit power or the CCA threshold level is adjusted based at least in part on the receiving.

* * * * *